United States Patent
Lee et al.

(10) Patent No.: US 9,826,503 B2
(45) Date of Patent: Nov. 21, 2017

(54) MULTI-SERVICE CONTENT BROADCAST FOR USER CONTROLLED SELECTIVE SERVICE RECEIVE

(71) Applicant: AT&T Mobility II LLC, Atlanta, GA (US)

(72) Inventors: Bo Lee, Alpharetta, GA (US); Yonghui Tong, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 459 days.

(21) Appl. No.: 14/526,982

(22) Filed: Oct. 29, 2014

(65) Prior Publication Data

US 2015/0055544 A1 Feb. 26, 2015

Related U.S. Application Data

(63) Continuation of application No. 13/875,399, filed on May 2, 2013, now Pat. No. 8,892,081, which is a
(Continued)

(51) Int. Cl.
*H04W 72/00* (2009.01)
*H04W 4/06* (2009.01)
(Continued)

(52) U.S. Cl.
CPC ........... *H04W 72/005* (2013.01); *H04W 4/06* (2013.01); *H04W 36/0011* (2013.01); *H04W 36/04* (2013.01)

(58) Field of Classification Search
CPC . H04W 72/005; H04W 4/06; H04W 36/0011; H04W 36/04
See application file for complete search history.

(56) References Cited

U.S. PATENT DOCUMENTS

| 7,177,658 B2 | 2/2007 | Willenegger et al. |
| 2003/0003899 A1 | 1/2003 | Tashiro et al. |

(Continued)

OTHER PUBLICATIONS

U.S. Office Action dated Apr. 10, 2014 in U.S. Appl. No. 13/875,399.
(Continued)

*Primary Examiner* — Ian N Moore
*Assistant Examiner* — Latresa McCallum
(74) *Attorney, Agent, or Firm* — Hartman & Citrin LLC

(57) ABSTRACT

A multimedia communications system for broadcast distribution of multimedia content to mobile terminals over a cellular network is disclosed. The disclosed system accesses content providers, receives corresponding content information associated with provider content, and broadcasts content information to user terminals. The user terminals include software and/or hardware for receiving the content information and enabling a user to subscribe to one or more content items. Once a subscription is in place for one or more content items, corresponding content IDs are sent to and stored at the terminal. The system facilitates broadcast of the content. Content IDs stored in the terminal and broadcasted content IDs are compared. Only the content associated with the matching content IDs is then downloaded to the user terminal for storage and/or presentation. Content associated with unmatched content IDs is prevented from being received.

19 Claims, 17 Drawing Sheets

Related U.S. Application Data continuation of application No. 11/423,292, filed on Jun. 9, 2006, now Pat. No. 8,447,284.

(51) Int. Cl.
*H04W 36/00* (2009.01)
*H04W 36/04* (2009.01)

(56) References Cited

U.S. PATENT DOCUMENTS

| | | | |
|---|---|---|---|
| 2003/0171118 A1* | 9/2003 | Miya | H04B 7/022 455/442 |
| 2004/0180675 A1 | 9/2004 | Choi et al. | |
| 2004/0203711 A1* | 10/2004 | O'Neill | H04W 8/08 455/422.1 |
| 2005/0085182 A1 | 4/2005 | Chuberre et al. | |
| 2005/0118992 A1* | 6/2005 | Jeong | H04W 4/06 455/422.1 |
| 2005/0288040 A1 | 12/2005 | Charpentier et al. | |
| 2006/0166699 A1 | 7/2006 | Aghvami et al. | |
| 2006/0274780 A1 | 12/2006 | Walsh et al. | |
| 2007/0101352 A1 | 5/2007 | Rabina et al. | |
| 2008/0261554 A1 | 10/2008 | Keller et al. | |

OTHER PUBLICATIONS

U.S. Notice of Allowance dated Jul. 18, 2014 in U.S. Appl. No. 13/875,399.
U.S. Office Action dated Apr. 29, 2009 in U.S. Appl. No. 11/423,292.
U.S. Office Action dated Nov. 10, 2009 in U.S. Appl. No. 11/423,292.
U.S. Office Action dated Nov. 30, 2011 in U.S. Appl. No. 11/423,292.
U.S. Office Action dated Apr. 13, 2012 in U.S. Appl. No. 11/423,292.
U.S. Office Action dated Sep. 20, 2012 in U.S. Appl. No. 11/423,292.
U.S. Notice of Allowance dated Jan. 16, 2013 in U.S. Appl. No. 11/423,292.

* cited by examiner

MULTI-SERVICE CONTENT BROADCAST FOR USER CONTROLLED SELECTIVE SERVICE RECEIVE

CROSS-REFERENCE TO RELATED APPLICATIONS

This application is a continuation of U.S. patent application Ser. No. 13/875,399, filed May 2, 2013, now U.S. Pat. No. 8,892,081, which is a continuation of U.S. patent application Ser. No. 11/423,292, filed Jun. 9, 2006, now U.S. Pat. No. 8,447,284.

TECHNICAL FIELD

This invention is related to cellular services, and more specifically, to providing multimedia content to mobile terminal devices.

BACKGROUND

Telecommunications is a rapidly evolving industry that has exploded in recent years with many types of services and supporting systems coming to market. The convergence of the Internet and wireless communications has opened the door for providing services that heretofore were not available to the cellular user. The use of mobile terminal devices such as cellular telephones is growing at rates that greatly exceed even the most optimistic predictions of only a few years ago. Cellular telephones have been widely accepted because they are inexpensive and allow individuals to move about freely yet stay in contact with friends, and further, to function as sources of entertainment. Companies are rushing to provide improved multimedia functionality in mobile terminals and/or cellular networks such that the mobile subscriber (or user) can enjoy audio and video content, for example.

Mobile subscribers are interested in at least the same wide variety of content which can be accessed via computers on global IP networks such as the Internet. For example, subscribers can input requests to providers for multimedia services that include information related to news, weather, traffic, stock information, game downloading, ring tone music downloads, streaming video content, and more. For some of these services such as streaming video or game downloading, subscribers are more cost conscious rather than caring about the specific time of the day the services can be provided. Moreover, for some of these services, many subscribers may desire common content and not care if they receive the service via a broadcast technology or peer-to-peer technique.

If a cellular operator is to support the duplicated services in a peer-to-peer manner, the operator has to invest in network capacity and operation expense. To recover the associated costs, the operator then has to charge the subscribers a higher rate even though the subscribers may not care if the content is delivered via a more economical technique such as a shared network resource. Consequently, the cost concerns associated with higher subscriber rates charged for peer-to-peer services can reduce the use of the above services by the mobile subscriber.

The broadcast service allows many users to receive the same service while using substantially reduced network resources as compared to providing the same via peer-to-peer transmissions. Accordingly, the operator can realize lower costs which will reflect in lower rates to the subscribers. In turn, the lower service charge will boost the demand on the services to improve the operator's revenue and profit margin. Additionally, data traffic is considered to be asymmetrical. In general, downlink data traffic occupies more bandwidth than uplink traffic in many data service categories, which implies opportunities for controlled, scheduled multimedia broadcast services and solutions.

Multimedia broadcast/multicast service (MBMS) is a technology for distributing multimedia content (e.g., mobile television (TV), streaming video, audio) over GSM (global system for mobile communications) and UMTS (universal mobile telecommunications system) cellular networks to mobile terminals (or handsets). MBMS is a 3GPP ($3^{rd}$ Generation Partnership Project) feature that provides multiple users with multimedia content from a single information source (a point-to-multipoint bearer service connection), and is applied only in the downlink using a common channel that is viewable by selected subscribers. The network and radio transmission resources for MBMS are utilized in an effective way via optimized downlink transmissions and shared network entities.

The MBMS broadcast function provides services to all subscribers, but cannot control selective subscription to provider content. The subscribers will be given either free service or pay a fee regardless if they use the service or not.

The MBMS multicast function provides comprehensive subscriber and session management capabilities for each MBMS subscriber in GSM and UMTS networks, and in each cell or sector. The function requires uplink communications for interaction between the service and the user and downlink communications for receiving the content.

However, MBMS multicast introduces substantial overhead processing in all of the nodes and interfaces. As a result, this function is not substantially more cost effective than the peer-to-peer solution. Thus, the MBMS multicast and broadcast services cannot provide sufficiently cost effective services from both operator and customer perspectives.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovative architecture is employed as a multimedia communications service (also referred to herein as a multimedia broadcast selective receive service (MBSRS)) that facilitates more efficient distribution of multimedia content (e.g., news, weather, sports) to mobile terminals of a cellular network by combining the simplicity of broadcasting with user-based subscription control capability to provide multimedia services in a more cost effective manner.

Generally, the MBSRS service provider accesses content providers, receives corresponding content information associated with provider content, and broadcasts content information to user terminals. The user terminals include software and/or hardware for accessing MBSRS services. After subscribing to one or more of the total available content, the corresponding content IDs are stored in the terminal as terminal content IDs. The MBSRS then facilitates broadcast of the content IDs to the user terminal, where the stored terminal content IDs and broadcasted content IDs are compared for matching IDs. The terminal presents the content information as user selectable information. Only the content associated with the matching content IDs is then downloaded to the user terminal for storage and/or presentation. Content associated with unmatched content IDs is prevented from being received In one exemplary implementation, the terminal software and/or hardware facilitates changing between at least two MBSRS modes: a first (or alert) mode, and a second (or data transfer) mode. In response to the terminal subscribing to the MBSRS to receive content from one or more content providers, a node of the cellular network communicates MBSRS content IDs associated with corresponding content categories (e.g., news, weather, stock reports) to the terminal via over-the-air (OTA) capability. The content IDs are stored in the terminal (now called terminal content IDs) and processed such that the terminal presents (e.g., displays) the corresponding MBSRS content categories to the user.

After the MBSRS capability is activated (e.g., by selecting to receive one or more of the subscribed content), the terminal changes from the first mode to the second mode. Software in the terminal then compares the terminal content IDs selected by the user (e.g., weather and sports, but not news and stock reports) with the broadcasted content IDs (e.g., all of the content associated weather, sports, news, and stock reports). If there is a match between the selected terminal content IDs and the broadcasted content IDs, the terminal changes to a packet connect state and connects to the network-specified point-to-multipoint bearer to receive MBSRS data flow of the selected content. After completion of the broadcast session, the terminal changes from the second mode back to the first mode to wait for a next session or a new command from the user.

When a broadcast session is initiated with multiple different categories of content, the MBSRS operates such that multimedia content of the different content providers can be multiplexed into a content stream for one or more broadcast sessions, and then delivered cyclically. Each broadcast session is assigned a fixed broadcast ID. The fixed broadcast ID is communicated to the mobile terminal upon subscription to the MBSRS.

In one implementation, the MBSRS utilizes capabilities and functions specified by 3GPP ($3^{rd}$ Generation Partnership Project) for the conventional multimedia broadcast/multicast service (MBMS) architecture, but further applies subscription control at the user terminal. Additionally, the architecture utilizes less resources than conventional systems and/or methodologies when providing the service.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
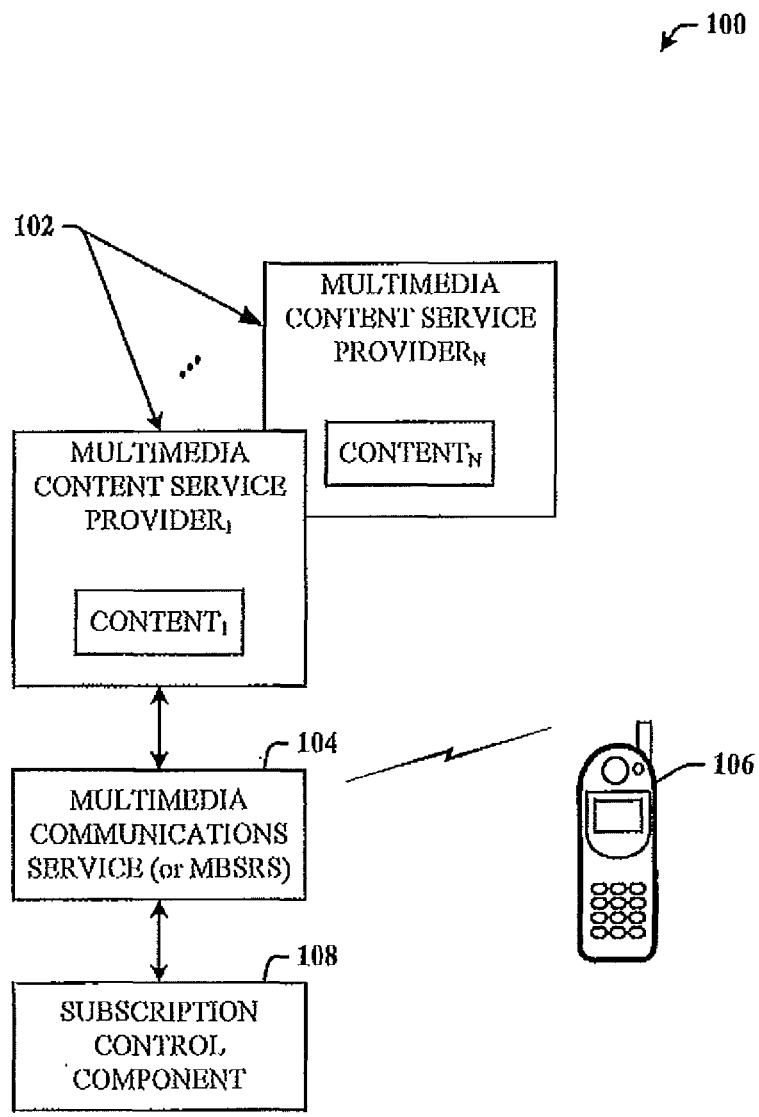
FIG. 1 illustrates a system that facilitates communication of services in a cellular network.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

The innovation is now described with reference to the drawings, wherein like reference numerals are used to refer to like elements throughout.

The disclosed architecture can be employed as a multimedia communications service (also referred to herein as a multimedia broadcast selective receive service (MBSRS)) that facilitates more efficient distribution of multimedia content (e.g., news, weather, sports) to mobile subscriber terminals of a cellular network by combining the simplicity of broadcasting with subscription control capability to provide multimedia services in a more cost effective manner. In one implementation, the MBSRS can utilize capabilities and functions specified by 3GPP ($3^{rd}$ Generation Partnership Project) for the conventional multimedia broadcast/multicast service (MBMS) architecture, but further applies subscription control. Additionally, the architecture utilizes less resources than conventional systems and/or methodologies when providing the service.

The MBSRS can use the 3GPP MBMS architecture and many of its functions. Each initiated broadcast session between the user terminal and the content provider can be assigned a fixed broadcast ID. When multiple categories of content are selected by the user, the respective fixed broadcast IDs are provided to the terminal in response to the terminal subscribing to the multimedia communications service. The terminal receives the selected broadcast content from the point-to-multipoint bearer when notified broadcast IDs of the service match the assigned fixed broadcast IDs selected by the user via the terminal and stored therein.

The cellular industry standardization body 3GPP has standardized MBMS in a series of technical specifications for reference: 3GPP TS 22.146 Multimedia Broadcast/Multicast Service, Stage 1 (Release 6); 3GPP TS 23.246 Multimedia Broadcast/Multicast Service, Architectural and Functional Description (Release 6); 3GPP TS 25.346 Introduction of the Multimedia Broadcast/Multicast Service in the Radio Access Network (RAN), Stage 2 (Release 6); 3GPP TS 43.246 Multimedia Broadcast/Multicast Service in GERAN (GSM EDGE Radio Access Network), Stage 2; 3GPP TS 22.246 Multimedia Broadcast/Multicast Service User Services, Stage 1 (Release 6); 3GPP TS 26.346 Multimedia Broadcast/Multicast Service, Protocols and Codecs (Release 6); and 3GPP TS 23.003, Numbering, Addressing, and Identification (CN4). The entireties of the above technical specifications are incorporated by reference herein.

Referring initially to the drawings, FIG. 1 illustrates a system 100 that facilitates communication of services in a cellular network. The system 100 includes one or more multimedia content service providers 102 (denoted PROVIDER$_1$, . . . , PROVIDER$_N$, where N is a positive integer), each of which provides corresponding content (denoted CONTENT$_1$, . . . , CONTENT$_N$) (e.g., news, sports, traffic information, weather information, gaming information, . . . ). A multimedia communications service 104 (also referred to as the MBSRS) of the system 100 monitors available service providers 102 (and associated content) and broadcasts content information about the available content to a mobile terminal 106 during a broadcast session. The content information is then presented (e.g., as graphical icons) to the mobile user for selection via a user interface.

The user selects one or more of the presented content information, and this selection information is stored for processing during the broadcast session. A subscription control component 108 facilitates controlling receipt of the multimedia content by the mobile terminal 106 based on accessing the selection information, comparing the selection information with the broadcast content information pushed from the service 104 to the terminal 106, and allowing receipt of content associated with the matched information at the terminal. A subscription establishes a relationship between the user (or user terminal 106) and the service provider(s) 102, which allows the user to receive the related service. Thus, the system 100 facilitates selective receipt of that content which the user desires to receive and in the case of fee-based services, for which s/he is willing to pay. Other broadcast content is ignored, and/or terminal access to other broadcast content is denied.

More specifically, content ID information associated with the content of the service providers 102 is downloaded to the terminal 106 in response to the terminal 106 subscribing to the communications service 104. The content ID information is stored in the terminal and processed to cause corresponding content icons to be displayed to the user that represent the associated provider content (e.g., news, weather, . . . ). The user then interacts with one or more of the content icons to select the associated content for download and stores the content ID information in the terminal 106. The selected content ID information is utilized to download the desired provider multimedia content to the terminal 106.

The communications service 104 facilitates the packaging and broadcasting of the provider content ID information and the corresponding provider content. The subscription control component 108 operates to compare the user selected content ID information stored in the terminal 106 with the network broadcasted content ID information. If there is a match, terminal 106 changes to a packet connect state and establishes connection to the network-specified point-to-multipoint bearer to receive content data flow. After download of the selected content is completed, the terminal changes in state to wait for the next broadcast session, or a new command from the user.

In one implementation, the service 104 is activated by the user selecting one or more of the presented content icons (associated with subscribed content services provided by the providers 102). In an alternative implementation or configuration, the service 104 is automatically activated according to scheduling data stored and processed in the terminal 106. In yet another implementation, the service 104 is continuously active as a background process that downloads and caches the content ID information in memory of the terminal 106. Thus, rather than the user having to wait for the terminal 106 to pull in the content ID information in response to a user interaction event (however brief that may be), the user will be able to quickly access all the latest available content for presentation and immediate selection.

In the illustration of FIG. 1, the control component 108 is shown external to the mobile terminal 106. However, in an alternative implementation, the control component 108 can be software stored in the terminal 106 and executed as an application or system process.

Note also that the broadcast service as accommodated by the communications service 104 can include one or several successive broadcast sessions (the session being a continuous and time-bounded reception of the broadcast service by the mobile terminal). A single broadcast service has a single broadcast session. A broadcast service can consist of a single on-going session as a media stream, or can involve several intermittent sessions (e.g., for messages) over an extended period of time. The service scenarios include streaming a continuous flow of data (e.g., audio and/or video content), file download services (for download of all the data before play can commence, as within an application), and carousel (a combination of streaming and file down load services) where the method for delivering the content is repetitious (or repeating) or updating of the data transmission is cyclical.

Figure 2:
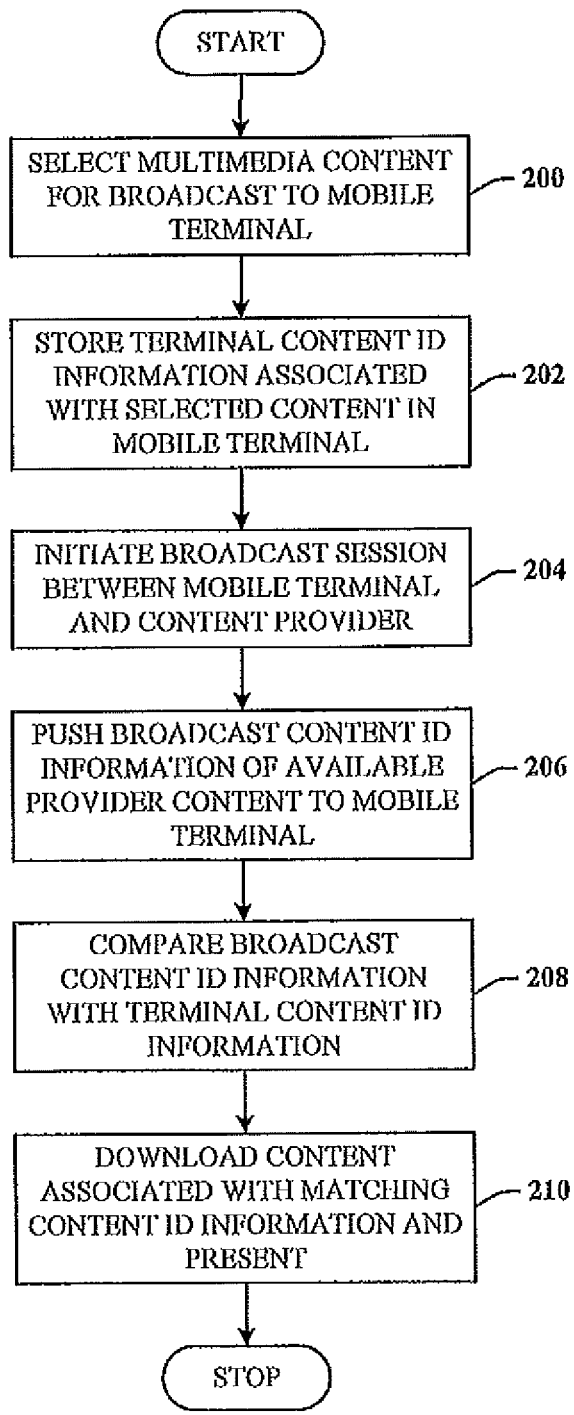
FIG. 2 illustrates a methodology of providing multimedia services in a cellular network.

FIG. 2 illustrates a methodology of providing multimedia services in a cellular network. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, multimedia content is selected for broadcast to the mobile terminal. At 202, terminal content ID information associated with the selected content is stored in the terminal. At 204, a broadcast session is initiated between the terminal and one or more content providers. At 206, content ID information associated with available provider content is pushed (or broadcast) to the terminal. At 208, broadcast content ID information is compared with the selected and stored terminal content ID information. At 210, content associated with matching broadcast content ID is downloaded to the mobile terminal and presented to the user.

Figure 3:
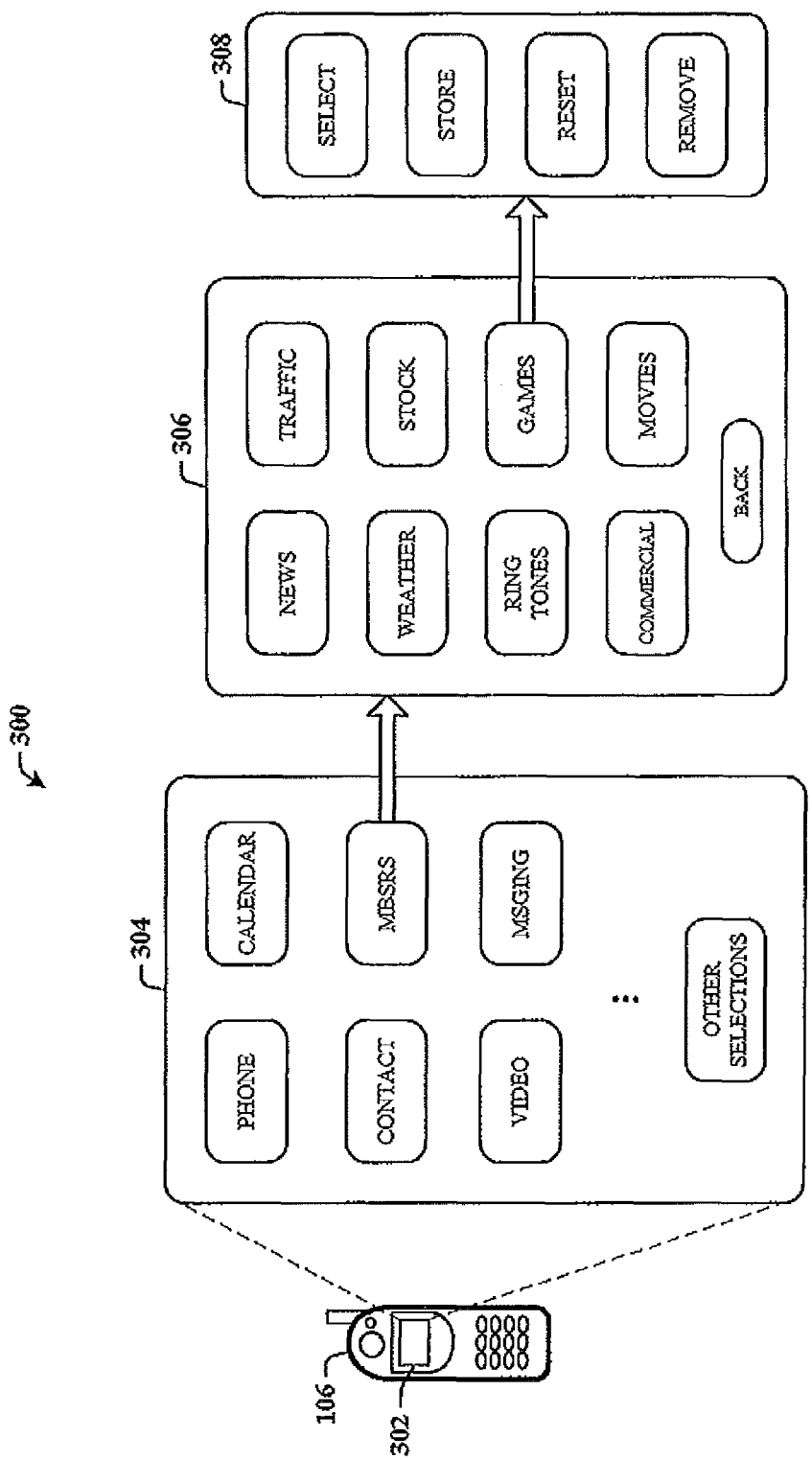
FIG. 3 illustrates an exemplary terminal interface for providing multimedia communications services for the mobile terminal.

FIG. 3 illustrates an exemplary terminal interface 300 for providing multimedia communications services for the mobile terminal 106. In this implementation, terminal functions are presented to a terminal user via a terminal display 302. The terminal 106 includes software suitable for facilitating user interaction through a user interface 304. One or more functions can be presented to the user via the user interface 304 (also referred to as a first interface screen) as selectable graphical icons or indicia. For example, non-related MBSRS functions can include a PHONE icon for selecting a function for configuring one or more phone features (where the terminal is a cell phone), a CONTACT icon having an associated function which when selected presents user contacts for making calls, for example, a VIDEO icon having an associated video function in support of handling and processing video information, a messaging icon (denoted as MSGING) for configuring messaging functionality (e.g., SMS-short message service, MMS-multimedia messaging service, instant messaging), a CALENDAR icon related to functions for storing time and date information of events the user desires to be scheduled, and other icons (denoted as OTHER SELECTIONS) associated with other functions not illustrated, but which can be employed, such as audio functions for configuring audio settings, for example.

In support of the disclosed MBSRS, the terminal user interface 304 also includes a selectable multimedia services icon associated with the disclosed service (denoted as MBSRS). When selected, the interface 304 presents a second interface screen 306 which provides selectable icons associated with additional MBSRS functionality. This particular implementation of the user interface 304 shows the available content which can be accessed from content providers. As indicated herein, when the user selects the MBSRS icon, the terminal 106 connects to the MBSRS service, which retrieves and downloads to the terminal content information associated with the content that can be accessed. The content information can include not only the content ID, but also data for processing by the user interface and/or other suitable terminal applications for the presentation of corresponding MBSRS service icons.

Here, the available content services are represented by eight interactive icons which indicate that news, traffic information, weather information, stock information, ring tone data, games, commercials (or advertisements), and movies, are available for access. In accordance with the disclosed innovation, the user can then select from the available content services which s/he desires to receive. For example, the user can select the broadcast and download of news, movies and weather information, while declining the broadcast and/or download of the remaining content (traffic, stock, ring tones, games, and commercial information).

In response to selection of a content service in the second interface screen 306, a third interface screen 308 opens to provide related interactive control functions of SELECT for selecting the content for download, STORE for storing the content in the terminal 106, RESET for nullifying a previous selection, and REMOVE for removing the associated content service from viewing via the second interface 306. Selecting the content using the SELECT button does not require that the content be stored on the terminal 106, but can simply cause the broadcasted content to be presented, and thereafter, deleted from the terminal 106 without storage and later play. However, it is within contemplation of the subject architecture that the icons can be programmable multi-function controls such that, for example, the user can program the SELECT function to include not only selecting the content for download, but also for presenting the content as it is being downloaded or shortly after completion of the download process. Removing the content icon by selecting the REMOVE function causes the underlying content ID from being used to as a means for downloading matching broadcast content via the MBSRS.

While certain ways of displaying information to users are shown and described with respect screens, those skilled in the relevant art will recognize that various other alternatives can be employed. The terms "screen," "screenshot", "webpage," and "page" can be used interchangeably. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

To this point, the description has focused on user interaction by way of manually selecting a graphical icon to effect terminal functions. This can be accomplished through utilization of touch screen and stylus-based technologies. However, it also is within contemplation of the subject services architecture that the terminal 106 can employ voice (or speech) recognition technology that receives and processes user commands that facilitate selection of terminal and/or MBSRS functions. For example, the user could program the illustrated MBSRS icon to read CONTENT, and after uttering the term "content", the term is processed to cause the user interface to open and present the second screen 306. Further, voice recognition can be employed to activate functions on all screens.

Other techniques can be employed to provide the user with selection feedback of selected functions. For example, in lieu of or in combination with the use of screens, the terminal interface can employ background changes in coloration to provide an indication that a function has been selected. If the user chooses to download news and weather, by selecting news, the NEWS icon can be programmed to exhibit a color associated with being selected, and the WEATHER icon exhibits the same color, both indicating that the content has been selected. These are only but a few examples of conventional techniques that can be employed as alternatives to, or in combination with, screen management of the user interface. A BACK button allows the user to navigate from the second interface screen 306 back to the first screen 304 without interacting with functions provided in the third screen 308.

The 3GPP specification defines the MBMS protocol as including an MBMS attribute TMGI (Temporary Mobile Group Identity) that comprises a mobile country code (MCC), a mobile network code (MNC), and three octets of MBMS Service ID. The MBMS attribute Session ID is a 1-octet data field. The MBMS session ID and TGMI (e.g., an MBMS Service ID) can be used for MBSRS subscription control and for an MBSRS-capable mobile terminal to selectively receive broadcasted multimedia services.

Upon subscription of the user terminal to MBSRS, the TGMI and MBMS session ID for MBSRS is sent to the mobile terminal via the over-the-air (OTA) interface. The session ID for a MBSRS service is fixed; however, this is not a requirement. The presence of the MBSRS session ID received into the mobile terminal triggers the creation of the MBSRS icons illustrated in the second interface screen 306 FIG. 3.

The operator can update the TGMI (and MBMS session ID) any time and alter any rule via the OTA interface without the mobile user knowing that the process is occurring. In other words, the update process can be performed as a background process that is completely transparent to the user.

Figure 4:
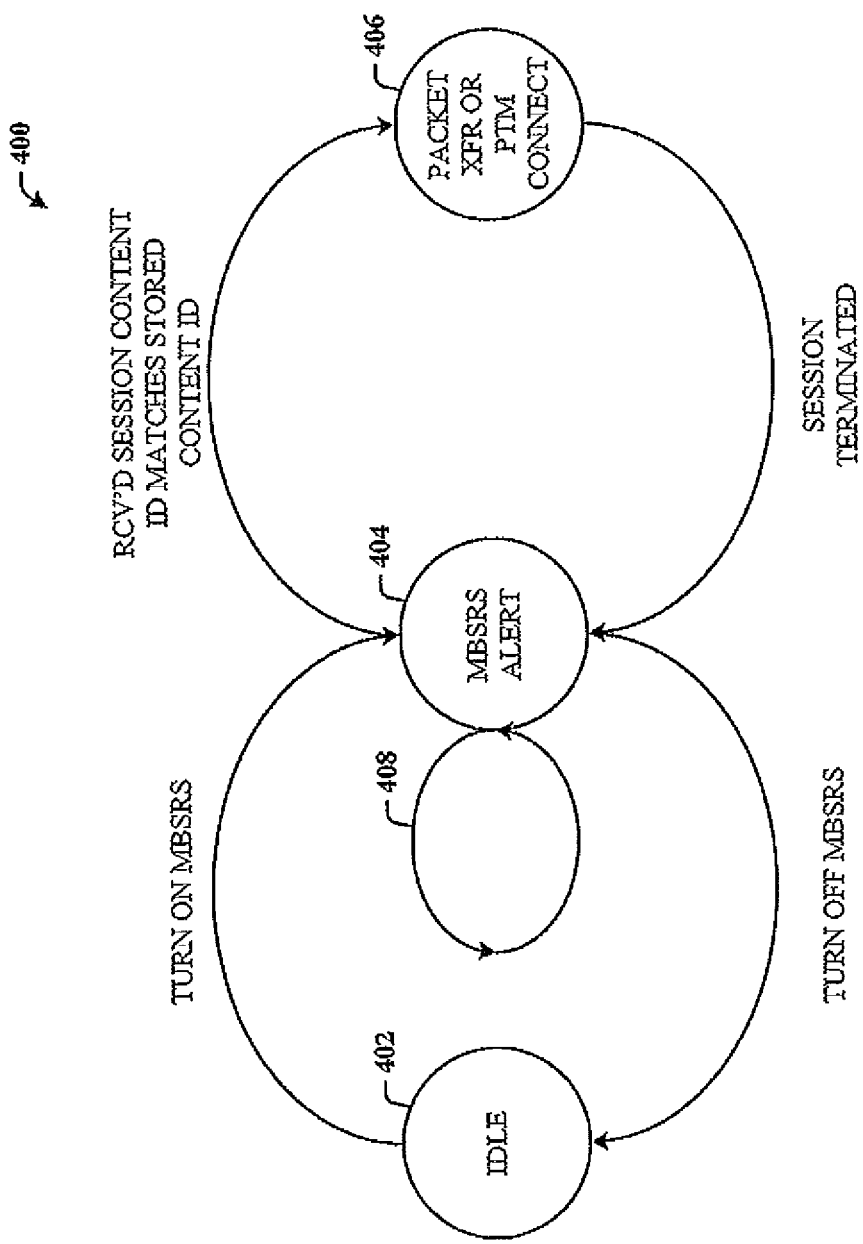
FIG. 4 illustrates a state diagram of an MBSRS service operation in the mobile terminal.

FIG. 4 illustrates a state diagram 400 of an MBSRS service operation in the mobile terminal. Initially, when operating outside the MBSRS service, the terminal operates in an IDLE state 402. In one implementation, selection of the MBSRS function in the first user interface screen 304 of FIG. 3 initiates automatic subscription of the terminal to the MBSRS. The MBSRS content information (including the content IDs) is then returned to the terminal using the OTA interface, for example. The content IDs of all available provider content are stored in the terminal and processed to present the corresponding MBSRS content service icons in the second screen 306 of FIG. 3.

In an alternative implementation for initiating MBSRS, selection of one of the MBSRS content services graphical icons in the second user interface screen 306 of FIG. 3 initiates the subscription process ("turns on MBSRS"). In either case, transitioning occurs from the IDLE state 402 to an MBSRS Alert state 404. The software function in the terminal compares the content IDs of the user-selected content with the network broadcasted MBSRS content IDs. If there is a match between one or more of the content IDs, terminal state transitions from the MBSRS Alert state 404 to a packet connect state 406, and establishes the network-specified point-to-multipoint (PTM) bearer to receive MBSRS data flow. After completion of selected content session (e.g., video only), the terminal state transitions from the packet connect state 406 back to MBSRS Alert state 404 to wait for a next session, or new command from the user. For example, the user can then select other MBSRS service content for download and processing (e.g., presentation and/or storage). If no other content is downloaded, state transitions from the Alert state 404 back to the IDLE state 402, thereby turning off (or idling) MBSRS access. An otherwise loop 408 extends from the MBSRS Alert state node 404 for handling signals related to other Alert node 404 processing.

In an alternative implementation for selection and download, rather than processing each content session separately, the user can select multiple MBSRS content services, the processing of which can be performed substantially concurrently. For example, if the user selects news and weather service, download of the news content and the weather content can be performed together. If the user chooses to first view the news content, the weather content can be downloaded to the terminal storage device for later presentation. This type of content management can be stored in a user profile of the terminal which can be employed to define preferred settings. For example, if the user routinely downloads three types of content, rather than manually interacting with the terminal to control which of the content is to be presented first, the user memorializes this preference information in the user profile, which profile is then accessed as part of the MBSRS processing to present the content in the desired order. Other management functions can also be stored as part of the user profile for automatic execution. For example, how often to activate MBSRS, when to activate, what content to access, what content to download first, and so on.

Depending on the access network architecture for delivery of the MBSRS, there are at least two network provisioning system implementations. A first system implementation uses existing EDGE (Enhanced Data Rates for GSM Evolution) and/or WCDMA (wideband CDMA) system architectures, while a second system implementation uses hierarchy cells structured in GERAN and/or UTRAN (UMTS Terrestrial Radio Access Network).

Figure 5:
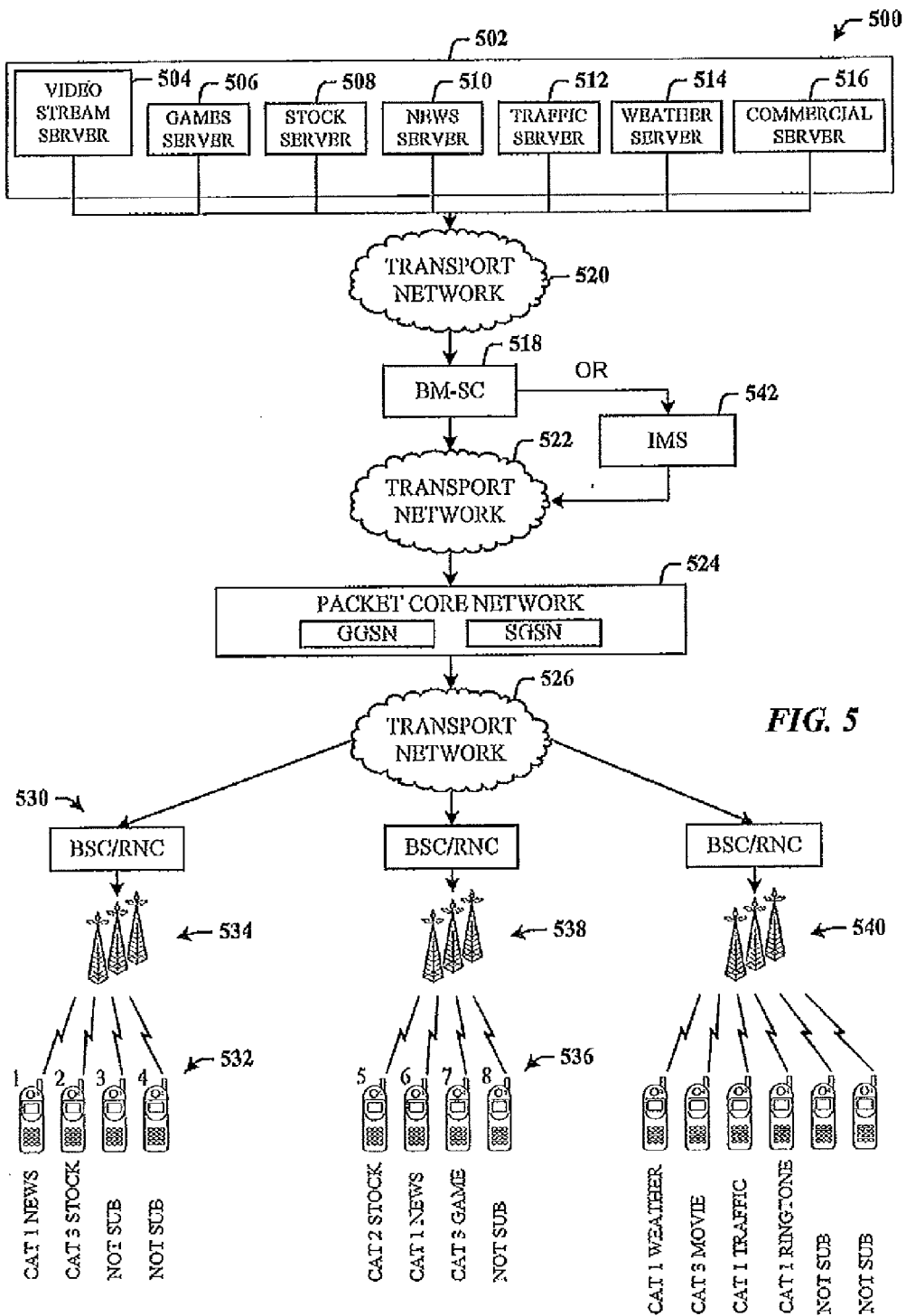
FIG. 5 illustrates a cellular system that employs the MBSRS in an existing EDGE and/or WCDMA system.

FIG. 5 illustrates a cellular system 500 that employs the MBSRS in an existing EDGE and/or WCDMA system. Notable attributes of this first system 500 include at least the following: the point-to-multipoint MBSRS bearer is mixed with other traffic bearers; the point-to-multipoint MBSRS bearer can be allocated on dedicated resource; and, the point-to-multipoint MBSRS bearer can also be allocated upon resource availability on a scheduled time table. The system 500 can utilize the existing MBMS-enabled GSM and UMTS infrastructures.

The system 500 illustrates several different content providers 502. In this example, content can be provided via a streaming video server 504, a gaming server 506, stock server 508, news server 510, traffic information server 512, weather information server 514, and commercial (or advertising) server 516. It should be understood that this is only a small sample of the types of accessible content services that can be accessed. For example, other content providers can provide content services associated with local, national and international information for any of the above types of content (e.g., local news, international news, . . . ), sports, music (or audio) streaming, and so on.

The content providers 502 interface to a BM-SC (broadcast/multicast service center) node 518 by way of a first transport network 520 (e.g., an IP network). The BM-SC 518 includes functions for MBMS user service provisioning and delivery, serving as an entry point for content provider MBMS transmissions, authorizing and initiating MBMS bearer services within the PLMN (public land mobile network) and, scheduling and delivering MBMS transmissions. The BM-SC 518 can also generate charging (or invoicing) records based on the content provider transmitted data, service announcements for both broadcast and multicast services, media descriptions specifying the media to be delivered, and session descriptions about the sessions being delivered to the mobile terminal.

The BM-SC 518 receives and processes (e.g., multiplexes) the provider content for broadcast over a second IP transport network 522 to a packet core network 524, which utilizes both a GGSN (gateway GPRS (general packet radio service) support node), and a SGSN (serving GPRS support node). The GGSN is the gateway between 3G networks and external networks. Signaling between the BM-SC 518 and the core network GGSN is handled by a Gmb reference point (not shown), and which includes user specific and bearer service messages. The SGSN performs user individual service control functions and concentrates all individual users of the same MBMS service into a single MBMS service. The SGSN maintains a single connection with the sources of the MBMS data. The GGSN terminates MBMS GTP (GPRS tunneling protocol) tunnels from the SGSN and links these tunnels via IP multicast with the MBMS data source. GTP is a Layer 3 tunneling protocol used between the SGSN and GGSN to tunnel multicast packets through the GPRS/UMTS network.

The core network 524 distributes the content over a third transport network 526 (using frame relay or IP, for example) to broadcast service areas (534, 538, 540) supported by GSM and/or UMTS infrastructures, using corresponding BSC/RNC equipment 530 (GSM capability via a base station controller (BSC) and/or UMTS capability via a radio network controller (RNC)).

Accordingly, terminals 532 operating in a first broadcast service area 534 can selectively receive broadcast content. For example, a first terminal can select to receive only news content, a second terminal can select to receive only stock content and, third and fourth terminals are selectively controlled to receive no content at all. Similarly, terminals 536 operating in a second broadcast service area 538 can selectively receive broadcast content. For example, a fifth terminal can select to receive only stock content, a sixth terminal can select to receive only news content, a seventh terminal receives only gaming content, and an eighth terminal can be controlled to not subscribe, thus, receiving no content at all. Yet again, in a third broadcast area 540, six terminals are illustrated as selectively receiving weather, movie, traffic, and ring tone content, with two terminals not subscribing to receive any of the broadcast content at all.

Note also that instead of the BM-SC 518 communicating directly with the second transport network 522, indirect communications can be provided from the BM-SC 518 through an IMS (IP multimedia subsystem) component 542. IMS is a standardized next generation architecture for providing mobile and fixed multimedia services. IMS can utilize a voice-over-IP (VoIP) implementation based on the 3GPP SIP (session initiation protocol), and can operate according to IP protocols.

In this particular implementation of system 500, the BM-SC 518 functions as a multiplex component such that multiple instances of the multimedia content are multiplexed and scheduled for broadcast. The MBSRS can be provided in a scheduled manner sharing network resources and/or with dedicated network resources. Note that although multiplexing is described as occurring in the BM-SC 518, the subject architecture is not so limited. It is within contemplation that multiplexing of content can occur in entities other than the BM-SC 518, or in entities that act in combination with the BM-SC 518. For example, multiplexing can occur in the IMS component 542, in an entity (not shown) of the core network 524, the second and/or third transport networks (522 and/or 526), the BSC/RNC systems 530, and so on.

Figure 6:
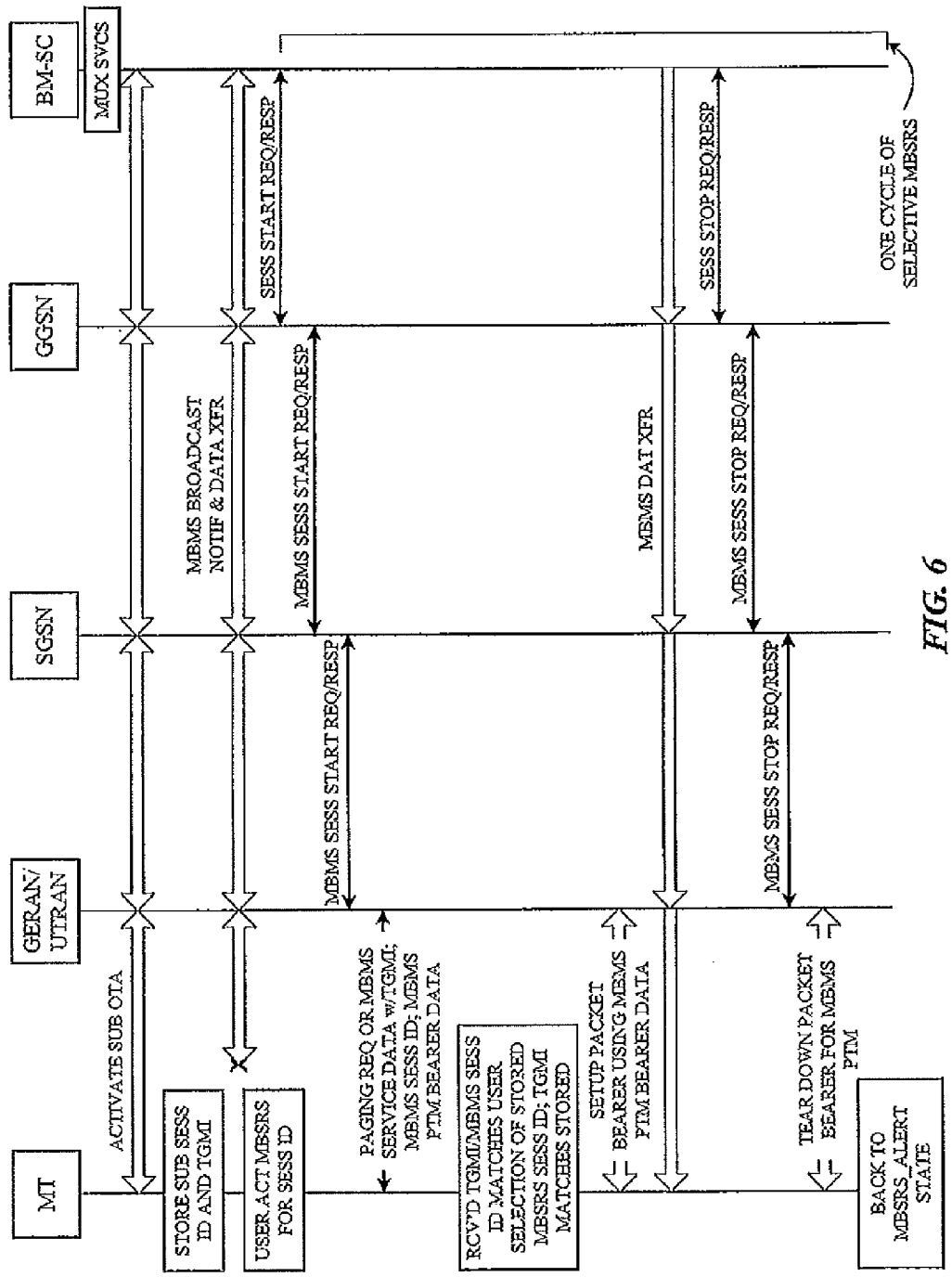
FIG. 6 illustrates a call flow diagram representing process flow for an MBSRS cycle of the system of FIG. 5.

FIG. 6 illustrates a call flow diagram representing process flow for an MBSRS cycle of the system 500 of FIG. 5. In this flow diagram, an MBSRS content ID is represented by an MBSRS session ID. Initially, the mobile terminal (MT) activates MBSRS subscription over to the GERAN and/or UTRAN infrastructure to the SGSN, the GGSN, and then the BM-SC. In the example, the BM-SC provides multiplexing capabilities for the broadcast of multiple content services IDs. The BM-SC facilitates transmission of a subscription session ID and MBMS attribute TGMI OTA to the terminal. If the BM-SC initiates broadcast of notification and data transfer, this operation can be processed from the GGSN through the GERAN and/or UTRAN infrastructures, but never reaches the terminal. Next, the user activates MBSRS for some or all of the content IDs (the MBSRS Alert state). The BM-SC processes a Session Start Request/Response message through the GGSN, the SGSN, and over the GERAN and/or UTRAN infrastructure to the terminal. The terminal receives as one or more packets a paging request or MBMS service data with TGMI, the MBMS content ID and MBMS PTM bearer data.

A check is then made at the terminal to determine if the received TGMI/MBMS content IDs match one or more of the user selections of stored MBSRS content IDs. The TGMI matches are then stored in the terminal for this session. If matched content IDs are present, the packet transfer state is entered and the packet bearer is configured using the MBMS PTM bearer data. Data transfer commences between the BM-SC to the terminal GGSN, SGSN and the GERAN and/or UTRAN infrastructure. A Session Stop Request/Response is then processed between the BM-SC and the terminal. The packet bearer channel is collapsed for MBMS PTM, and the terminal transitions back to the MBSRS Alert state for the next MBSRS service request or user command. Note, as illustrated, one cycle of selective MBSRS is defined to include activity from the session start to transition of the terminal back to the MBSRS Alert state.

In this implementation, a new physical channel can be employed to carry the downlink-only broadcasting data, which is similar to MTCH proposed in 3GPP Release 6, where MTCH is the MBMS point-to-multipoint traffic channel, and MBMS is the new channel defined by 3GPP Release 6 technical specification. All mobile terminals subscribing to MBSRS can receive the subscribed data through this physical channel. The MBSRS content ID can be communicated OTA to the mobile terminal at fixed or variable intervals. The terminal stores the MBSRS content ID and uses it to match the content IDs of broadcast data streams in order to decode the data. MTCH should have a dedicated resource so the throughput is guaranteed. 8PSK can be provided initially to be backward compatible with current EDGE phones.

Note that MTCH is downlink only; no uplink data is needed (this is similar to TV broadcasting). Since broadcasting can be continuous to the subscriber terminal, the terminal can be tuned to the broadcasting at any time s/he desires as long as s/he passes subscription. The session ID will be communicated OTA to the terminal upon power on, and updated at fixed or variable interval. When the terminal is tuned to receive broadcast content, it can also receive paging for incoming voice/date calls, SMS, etc. At any time, the subscriber terminal can terminate the broadcast connection and return back to the normal phone service mode. For GSM, the existing infrastructure can be used. For UMTS, the existing infrastructure can be used, using a dedicated RAB (radio access bearer) channel for broadcasting.

Figure 7:
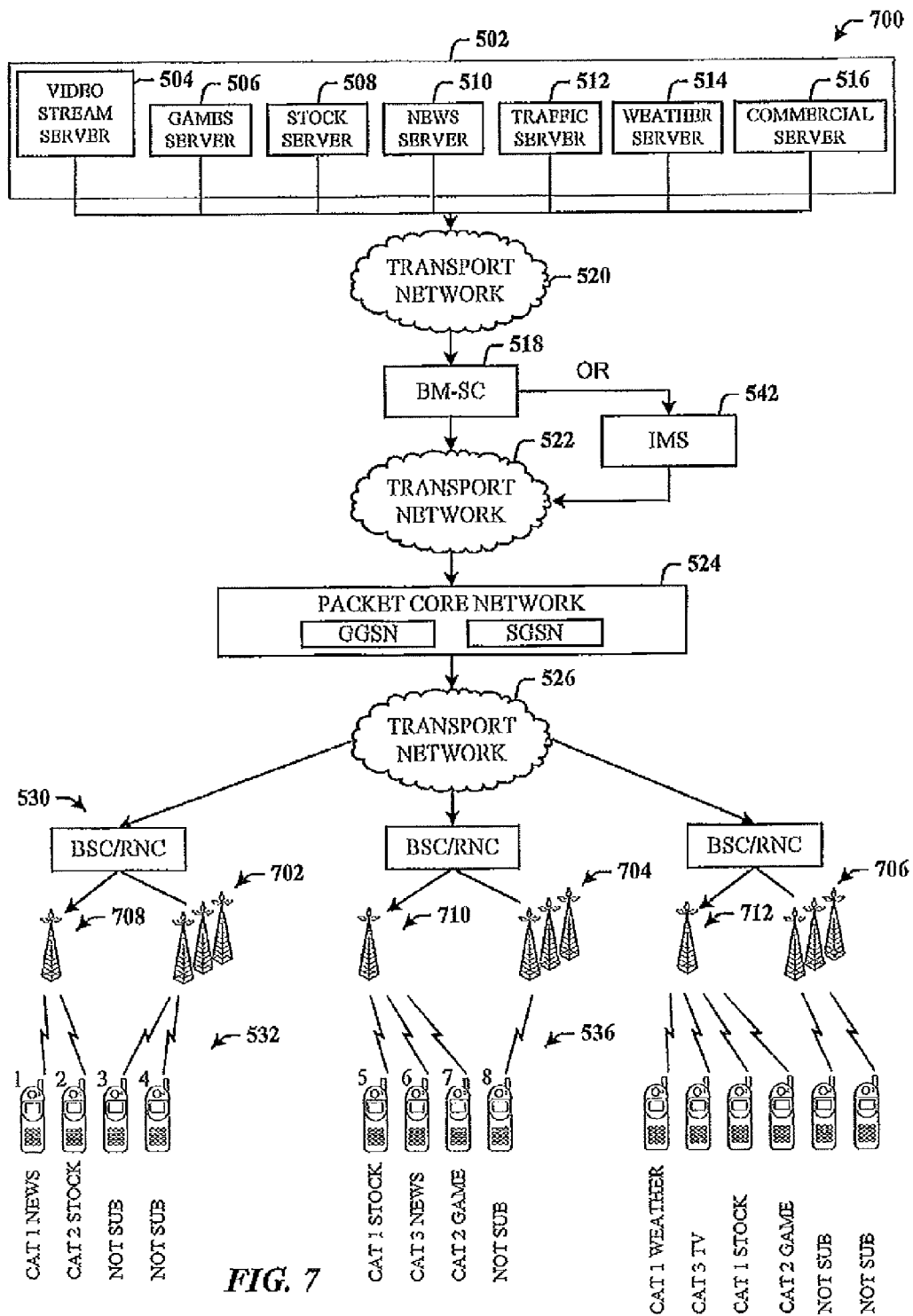
FIG. 7 illustrates an alternative cellular system that uses hierarchy cells structured in GERAN and/or UTRAN.

FIG. 7 illustrates an alternative cellular system 700 that uses hierarchy cells structured in GERAN and/or UTRAN. This alternative system 700 utilizes dedicated resources in the access network. In other words, the access network uses another layer that operates in its own radio carrier(s). The carrier(s) can be the same in all of the MBSRS cells or sectors because there are only downlink channels. When a terminal determines that the user selected MBSRS content ID matches a network broadcasted content ID, the terminal reselects or hands over to the MBSRS cell to receive MBSRS data flow.

Other notable characteristics of this alternative implementation can include the following: some cells are dedicated to deliver MBSRS; one MBSRS cell (a super cell) can cover the service area of a cluster of regular cells; the MBSRS cell can collocate with a regular cell from the cluster; MBSRS cells use same dedicated frequency or reuse a low number of frequencies; MBSRS cells can be synchronized; a terminal hands over to an MBSRS cell when the notified broadcast IDs matches the assigned fixed broadcast IDs; and the MBSRS can be operational at all times.

The system 700 includes many similar aspects of the system 500 of FIG. 5, the description of which can be referenced supra, and substantially omitted here for sake of brevity. The system 700 can include several different content providers 502 for content related to streaming video, gaming, stocks, news, traffic information, weather information, and commercial (or advertising), associated with the corresponding servers (504, 506, 508, 510, 512, 514 and 516).

The content is received at the BM-SC node 518 by way of the first transport network 520. The BM-SC 518 receives and processes (e.g., multiplexes) the provider content for broadcast over the second IP transport network 522 to the core network 524, which utilizes both the GGSN and SGSN. The core network 524 distributes the content over the third transport network 526 to broadcast service areas (or cell clusters) (702, 704 and 706) supported by GSM and/or UMTS infrastructures, using corresponding BSC/RNC equipment 530 (GSM capability via the BSC and/or UMTS capability via the RNC).

As indicated above, when one of the terminals 532 activates the MBSRS, it is handed over from the regular cell of the cell cluster 702 to an MBSRS super cell 708 until the MBSRS service has completed and the service is deallocated. Thereafter, the terminal is handed back to the regular cell cluster 702. Alternatively, a terminal 532 can communicate with cell cluster 702 (for example, to service a voice call) while simultaneously receiving broadcast content from MBSRS cell 708.

Accordingly, at the frontend systems BSC/RNC 530, one or more of the terminals 532 operating in a first broadcast service area 702 can selectively receive broadcast content. For example, the first terminal user can select to receive only news content, the second terminal can select to receive only stock content, which the first and second terminals are handed over from cells 702 to the MBSRS cell 708 to receive the selected broadcast content. The users of the third and fourth terminals have not selected MBSRS services and thus, remain in the regular cell cluster 702, receiving no MBSRS content at all.

Similarly, one or more of the terminals 536 operating in the second broadcast service area 704 can selectively receive broadcast content. For example, the fifth terminal can select to receive only stock content, the sixth terminal can select to receive only news content, the seventh terminal receives only gaming content, and the eighth terminal can be controlled to not subscribe, thus, receiving no content at all. Accordingly, the fifth, sixth, and seventh terminals are handed over to the associated MBSRS cell 710 to receive selected broadcast content. Once completed, and no more MBSRS content is selected, these terminals can be handed back to the regular cell cluster 704.

Yet again, in the third broadcast area 706, six terminals are illustrated as selectively receiving weather, TV, stock information, and game content information, with the remaining two terminals not subscribing to receive any of the MBSRS broadcast content at all. Accordingly, the first four terminals are handed over to the MBSRS cell 712 to receive selected MBSRS broadcast content. Once completed, and no more MBSRS content is selected, these terminals can be handed back to the regular cell cluster 706.

As before, note also that instead of the BM-SC 518 communicating directly with the second transport network 522, indirect communications can be provided from the BM-SC 518 through the IMS component 542. Similarly, multiple instances of the multimedia content can be multiplexed and scheduled by the BM-SC 518. The MBSRS can be provided in a scheduled manner sharing network resources and/or with dedicated network resources. Note that although multiplexing is described as occurring in the BM-SC 518, the subject architecture is not so limited. It is within contemplation that multiplexing of content can occur in entities other than the BM-SC 518, or in entities that act in combination with the BM-SC 518. For example, multiplexing can occur in the IMS component 542, in an entity (not shown) of the core network 524, the second and/or third transport networks (522 and/or 526), the BSC/RNC systems 530, and so on.

Figure 8:
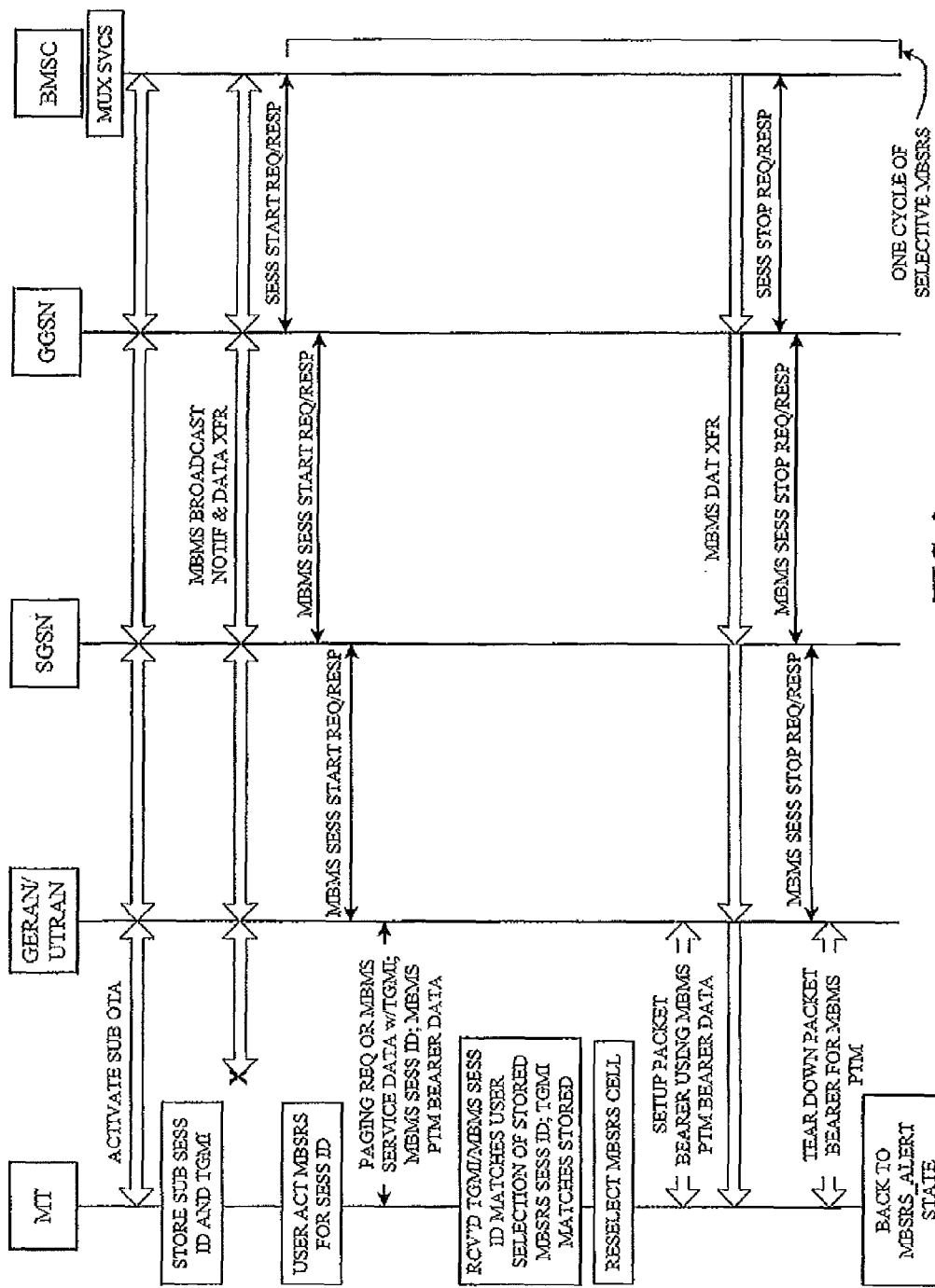
FIG. 8 illustrates a call flow diagram representing process flow for an MBSRS cycle of the system of FIG. 7.

FIG. 8 illustrates a call flow diagram representing process flow for an MBSRS cycle of the system 700 of FIG. 7. In this flow diagram, an MBSRS content ID is represented by an MBSRS session ID. Initially, the mobile terminal (MT) activates MBSRS subscription over to the GERAN and/or UTRAN infrastructure to the SGSN, the GGSN, and then the BM-SC. In the example, the BM-SC provides multiplexing capabilities for the broadcast of multiple content services IDs. The BM-SC facilitates transmission of a subscription session ID and MBMS attribute TGMI OTA to the terminal. If the BM-SC initiates broadcast of notification and data transfer, this operation can be processed from the GGSN through the GERAN and/or UTRAN infrastructures, but never reaches the terminal.

Next, the user activates MBSRS for some or all of the content IDs (the MBSRS Alert state). The BM-SC processes a Session Start Request/Response message through the GGSN, the SGSN, and over the GERAN and/or UTRAN infrastructure to the terminal. The terminal receives as one or more packets a paging request or MBMS service data with TGMI, the MBMS content ID and MBMS PTM bearer data.

A check is then made at the terminal to determine if the received TGMI/MBMS content IDs match one or more of the user selections of stored MBSRS content IDs. The TGMI matches are then stored in the terminal for this session. If matched content IDs are present, the MBSRS cell is reselected. Thereafter, the packet transfer state is entered and the packet bearer is configured using the MBMS PTM bearer data. Data transfer commences between the BM-SC to the terminal GGSN, SGSN and the GERAN and/or UTRAN infrastructure. A Session Stop Request/Response is the processed between the BM-SC and the terminal. The packet bearer channel is collapsed for MBMS PTM, and the terminal transitions back to the MBSRS Alert state for the next MBSRS service request or user command. Note, as illustrated, one cycle of selective MBMS is defined to include activity from the session start to transition of the terminal back to the MBSRS Alert state.

Figure 9:
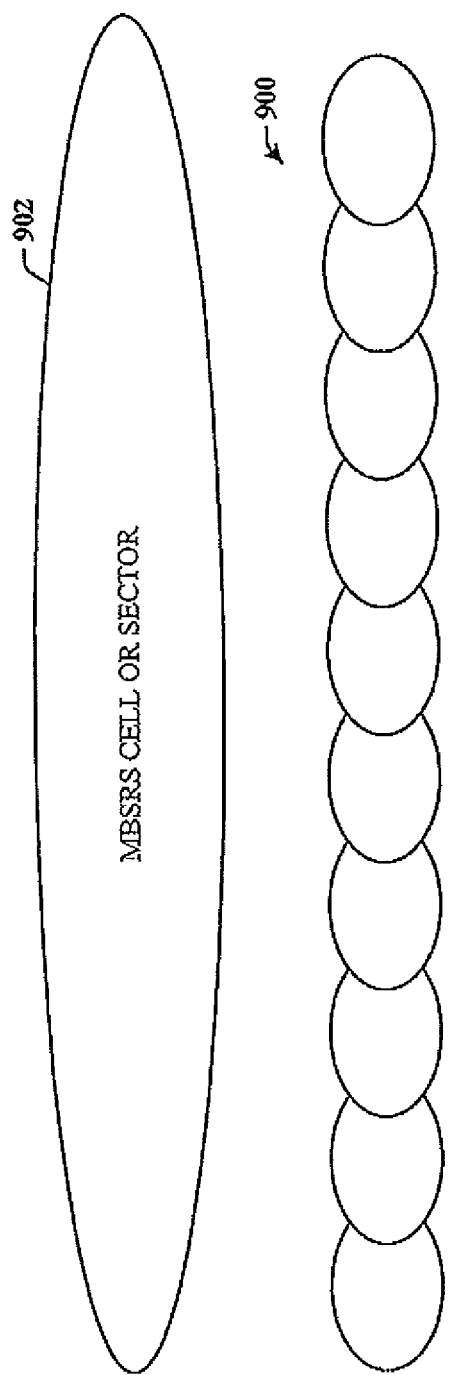
FIG. 9 illustrates the relationship between a regular cell cluster and an MBSRS cell.

FIG. 9 illustrates the relationship between a regular cell cluster 900 and an MBSRS cell 902. The MBSRS cell 902 in the MBSRS layer can be much larger than the normal cells or sectors 900. Additionally, the MBSRS cells or sectors site can be collocated with the normal cell sites. The network capacity for supporting MBSRS is a fraction of existing network and is homogenous across the entire network. Moreover, the network expansion for MBSRS layer and regular layer can be decoupled. Network expansion for the interactive services will only need to consider the demands from interactive services.

In this alternative implementation of system 700, the new cell layer is provided for broadcasting purposes. The MBSRS cells have much larger coverage than the regular cell (e.g., with higher antenna gain, higher antenna position, higher power). The same session ID based security can be used for allowing/rejecting devices to tune to the broadcast. The associated layer can use the same channel structure as existing system infrastructure (GSM or UMTS), a difference being that the layer is used primarily or solely for downlink broadcasting. A downlink channel similar to MTCH can be utilized. When powering up, the mobile camps on the normal layer but receives the frequency information for the broadcast layer.

Additionally, the terminal can switch (cell reselect) to the broadcast layer by manual selection or based on a periodic schedule. A broadcast layer area update procedure (similar to location update) can be provided to locate the mobile terminal for paging. When on the broadcast layer, the terminal is able to receive paging information for incoming calls and/or messaging (e.g., SMS) after which the terminal switches back to the normal layer. Once the call is completed, the terminal stays in normal mode for short period of time (that is configurable), and then returns back to broadcast layer, if desired. Mobility among broadcast layer cells can be provided by techniques similarly provided in the normal layer. For GSM, a BCCH-only transmit can be used including BCCH, 1-2 SDCCH (for paging capacity), and the remaining are dedicated data time slots for download broadcasting. A minimum reuse pattern (of 4112) with site synchronization is sufficient. For UMTS, a 5 MHz channel can be used.

Content from the multiple content providers can be multiplexed for the broadcast sessions and delivered cyclically. The MBSRS can use the MBMS broadcast functions on the point-to-multipoint bearer to deliver the multiplexed content. The MBSRS can be provided on a regular access layer as associated with MBMS. Alternatively, or in combination therewith, the MBSRS can also be provided on an overlay access layer. Additionally, the MBSRS does not need to use any multicast management functions in any of the nodes.

As indicated above, multiple selected multimedia content can be multiplexed (e.g., in the BM-SC node) for transmission on the bearer channel. It is also within contemplation of the subject architecture the multiplexing can occur in the mobile terminal, as well as other network entities. For the MBSRS, one session can be configured to include one multimedia content item or one session can be configured to include several multiplexed content items. The session ID can be used by the terminal to receive MBSRS. In this example implementation, the BM-SC assigns the session ID to each content service. For example, news content is associated (e.g., tagged) with an MBSRS news session ID that uniquely identifies it within a category of content having several different kinds of content. This applies similarly to the other category content. For example, the global session ID is tagged to content in each of the MBSRS categories. The following Table 1 illustrates an example of session ID allocation.

TABLE 1

Fixed Session ID assignment individual multimedia content for the MBSRS.

| MBSRS categories | Content of MBSRS | PLMN wide global unique MBSRS Session ID |
| --- | --- | --- |
| Category 1 | News | MBSRS news Session ID |
| | Stock | MBSRS stock Session ID |
| | Traffic | MBSRS traffic Session ID |
| | Weather | MBSRS weather Session ID |
| | Commercial | MBSRS commercial Session ID |

TABLE 1-continued

Fixed Session ID assignment individual multimedia content for the MBSRS.

| MBSRS categories | Content of MBSRS | PLMN wide global unique MBSRS Session ID |
| --- | --- | --- |
| Category 2 | News | MBSRS news Session ID |
| | Stock | MBSRS stock Session ID |
| | Traffic | MBSRS traffic Session ID |
| | Weather | MBSRS weather Session ID |
| | Commercial | MBSRS commercial Session ID |
| | Ring tune | MBSRS ring tune Session ID |
| | Music | MBSRS music Session ID |
| | Game | MBSRS game Session ID |
| Category 3 | News | MBSRS news Session ID |
| | Stock | MBSRS stock Session ID |
| | Traffic | MBSRS traffic Session ID |
| | Weather | MBSRS weather Session ID |
| | Commercial | MBSRS commercial Session ID |
| | Ring tune | MBSRS ring tune Session ID |
| | Music | MBSRS music Session ID |
| | Game | MBSRS game Session ID |
| | TV | MBSRS TV Session ID |
| | Movie | MBSRS movie Session ID |

In an alternative implementation where one session can be configured to include several multiplexed content, the BM-SC assigns one session ID along with a category to a block of different content in the one session. For example, news, stock, traffic, weather, and commercial content are associated (e.g., tagged) with an MBSRS category ID and session ID that uniquely identifies the content block for that category. The following Table 2 illustrates an example of session and category IDs for multiplexed allocation.

TABLE 2

Fixed Session ID assignment for blocks of multimedia content for the MBSRS.

| MBSRS categories | Content of MBSRS | PLMN wide global unique MBSRS Session ID |
| --- | --- | --- |
| Category 1 | News | MBSRS category 1 Session ID |
| | Stock | |
| | Traffic | |
| | Weather | |
| | Commercial | |
| Category 2 | Music | MBSRS category 2 Session ID |
| | Game | |
| Category 3 | TV | MBSRS category 3 Session ID |
| | Movie | |

Figure 10:
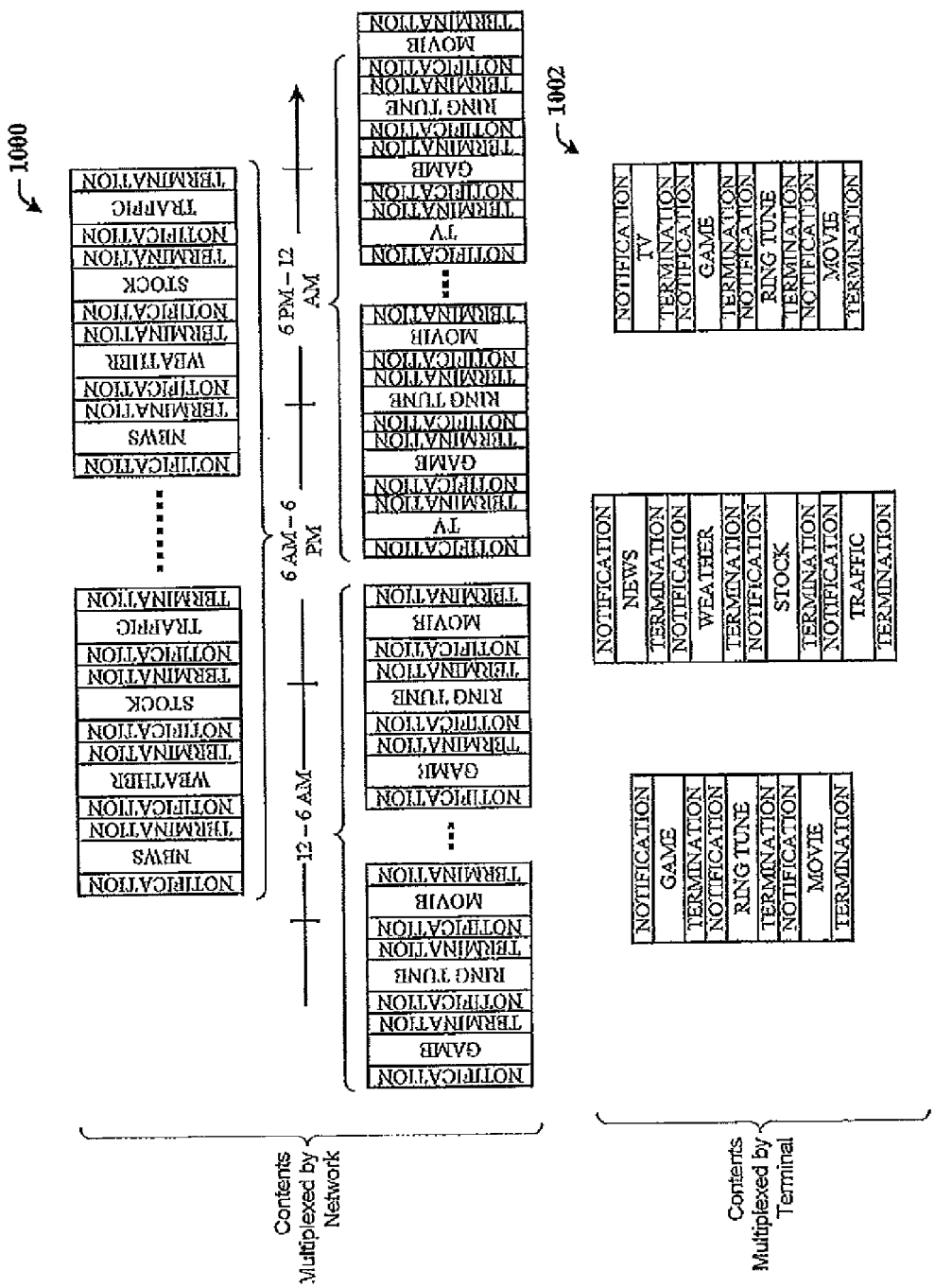
FIG. 10 illustrates a scheduling diagram of multiplexed MBSRS content of one content type per session for broadcast over a predetermined time period.

FIG. 10 illustrates a scheduling diagram of multiplexed MBSRS content of one content type per session for broadcast over a predetermined time period. Here multiplexed content 1000 is one example representation of content that has been multiplexed in the BM-SC, and is represented as three blocks of content that are broadcast repetitively within each block of time over a 24-hour period. In a first 6-hour period, game content, ring tune content, and movie content is broadcast repetitively. During a subsequent 12-hour period, news, weather, stock, and traffic content is broadcast repetitively. In the final 6-hour time period, television, game, ring tune and movie content is broadcast repetitively. Each content type is encapsulated within an initial notification signal followed by a termination signal.

Multiplexed content 1002 is one example representation of content that has been multiplexed in the mobile terminal. In the first 6-hour period, game content, ring tune content, and movie content is broadcast and multiplexed in the terminal. During a subsequent 12-hour period, news, weather, stock, and traffic content is broadcast and multiplexed in the terminal. In the final 6-hour time period, television, game, ring tune and movie content is broadcast to the terminal and multiplexed therein. Each content type is encapsulated within an initial notification signal followed by a termination signal.

Figure 11:
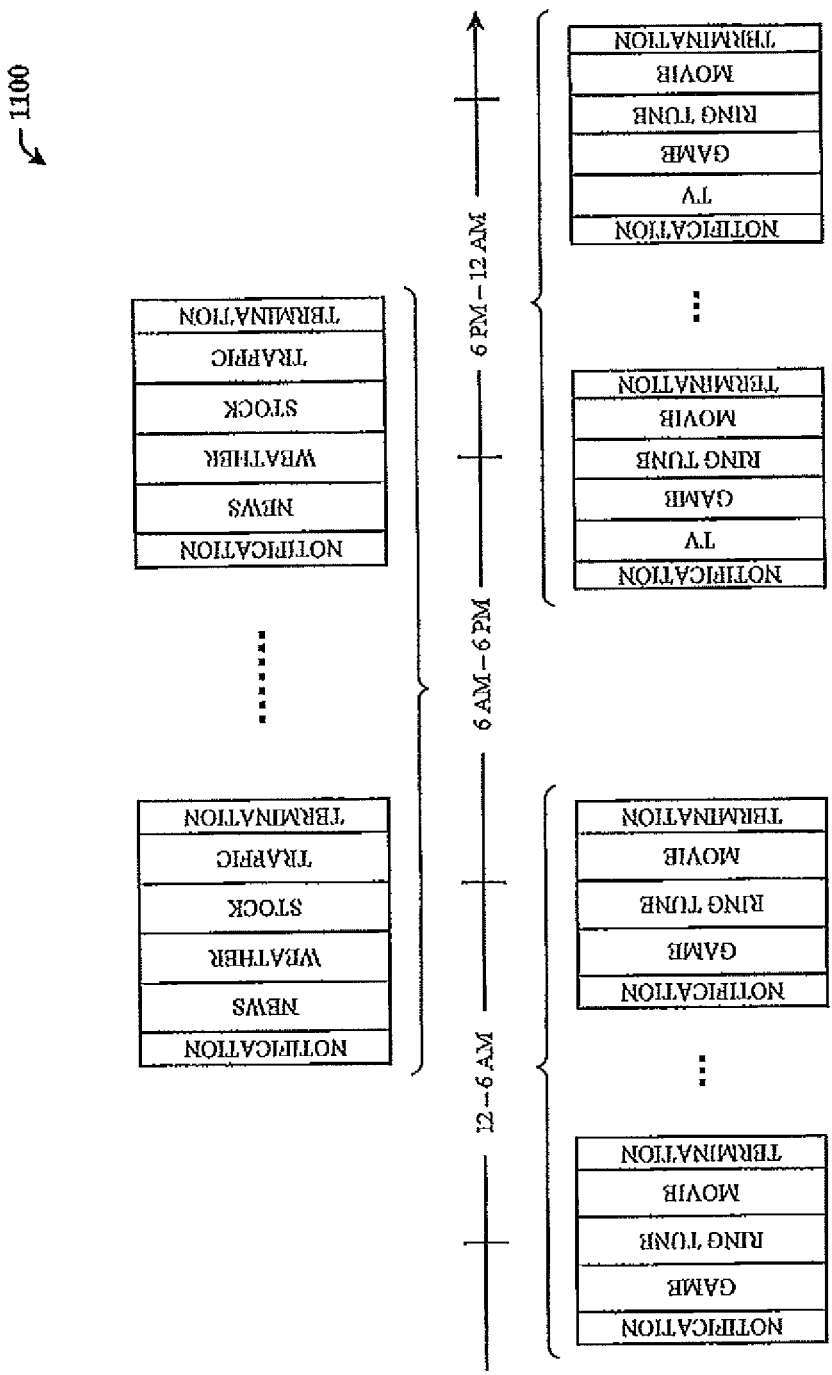
FIG. 11 illustrates a scheduling diagram of multiplexed MBSRS content of multiple content types per session for broadcast over a predetermined time period.

FIG. 11 illustrates a scheduling diagram 1100 of multiplexed MBSRS content of multiple content types per session for broadcast over a predetermined time period. Here, three blocks of multiplexed content are broadcast over a 24-hour period. In a first 6-hour period game, ring tune and movie content is broadcast repeatedly. During a subsequent 12-hour period, news, weather, stock, and traffic content is broadcast repeatedly. In the final 6-hour time period, television, game, ring tune and movie content is broadcast repeatedly. Each block of content is encapsulated within an initial notification signal followed by a termination signal.

Figure 12:
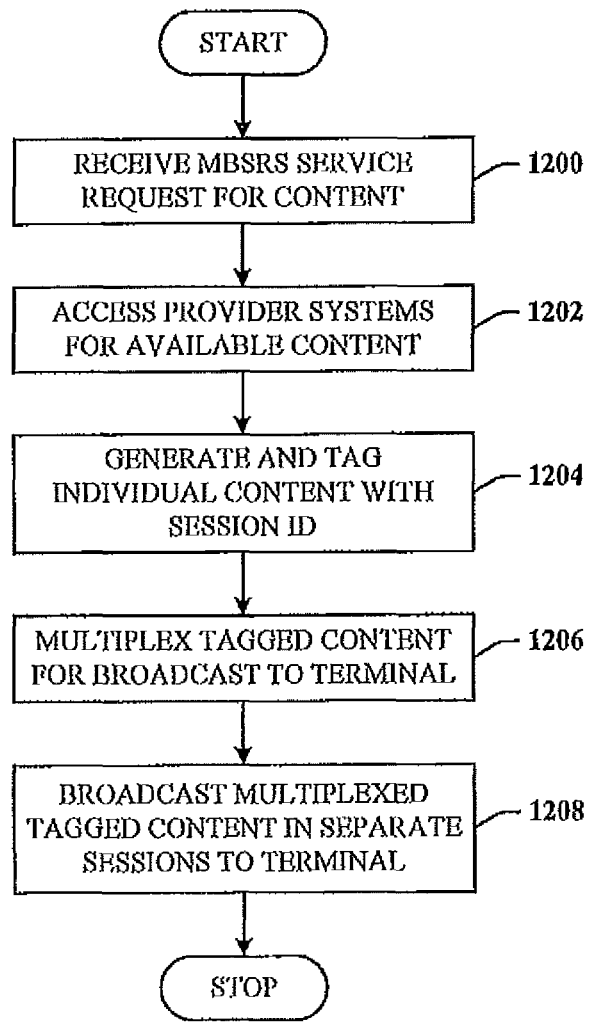
FIG. 12 illustrates a flow diagram of a methodology of tagging and multiplexing individual MBSRS content for broadcast to a mobile terminal.

FIG. 12 illustrates a flow diagram of a methodology of tagging and multiplexing individual MBSRS content for broadcast to a mobile terminal. At 1200, an MBSRS request for provider content is received. At 1202, content provider systems are accessed for available content. At 1204, a session ID tag for content is generated and tagged to the content individually. At 1206, the tagged content is multiplexed for broadcast to the terminal. At 1208, the multiplexed and tagged content is broadcast in separate sessions to the terminal.

Figure 13:
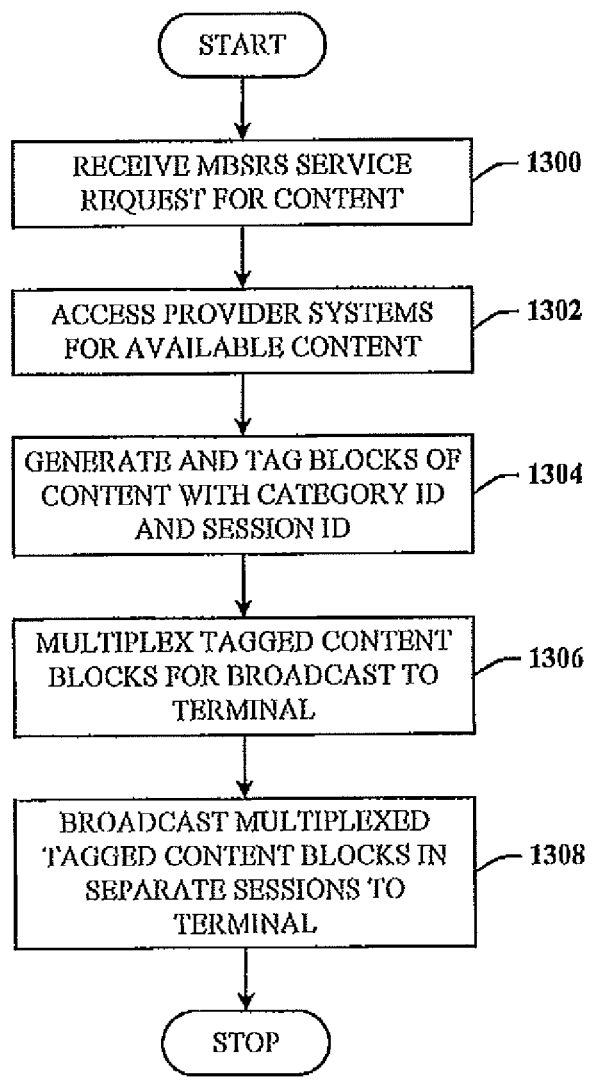
FIG. 13 illustrates a flow diagram of a methodology of tagging a multiplexing blocks of content to a requesting terminal.

FIG. 13 illustrates a flow diagram of a methodology of tagging a multiplexing blocks of content to a requesting terminal. At 1300, an MBSRS request for provider content is received. At 1302, content provider systems are accessed for available content. At 1304, session and category IDs are generated and tagged to blocks of content. At 1306, the tagged content is multiplexed as blocks of content. At 1308, the multiplexed block of content is broadcast in separate sessions to the requesting terminal.

Figure 14:
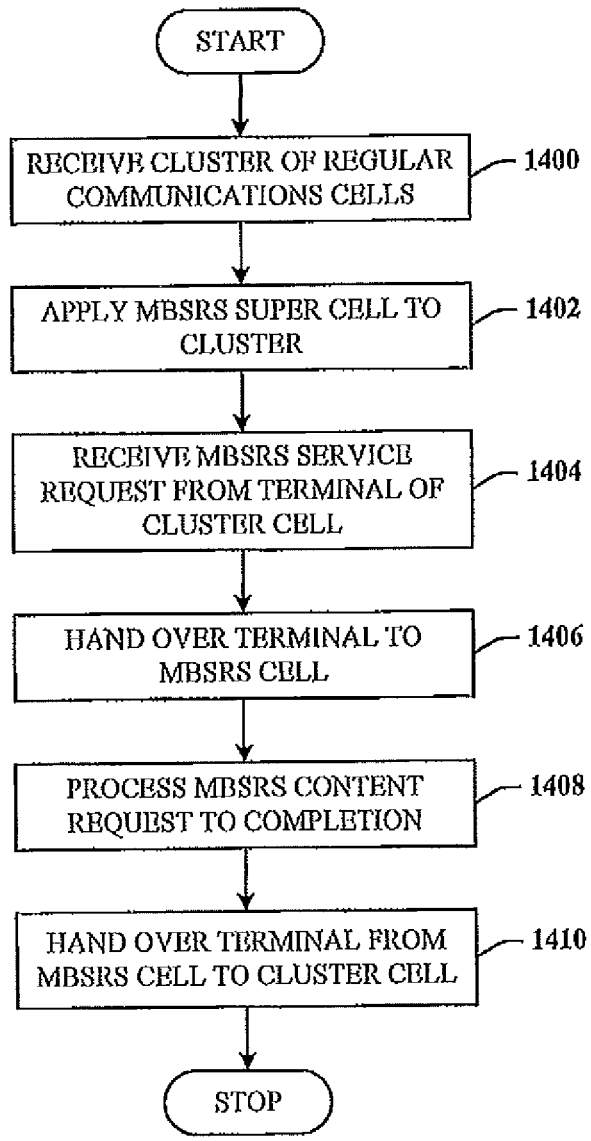
FIG. 14 illustrates a flow diagram of a methodology of utilizing an MBSRS super cell for MBSRS processing.

FIG. 14 illustrates a flow diagram of a methodology of utilizing an MBSRS super cell for MBSRS processing. At 1400, a cluster of regular cellular communications cells is received and deployed. At 1402, an MBSRS super cell is applied in combination with the cluster. At 1404, an MBSRS service request is received from a mobile terminal of a cluster cell. At 1406, the terminal is handed over to the MBSRS super cell for content processing. At 1408, the MBSRS content is broadcast to completion. At 1410, the terminal is handed back over to the cluster cell for normal cellular operation.

Figure 15:
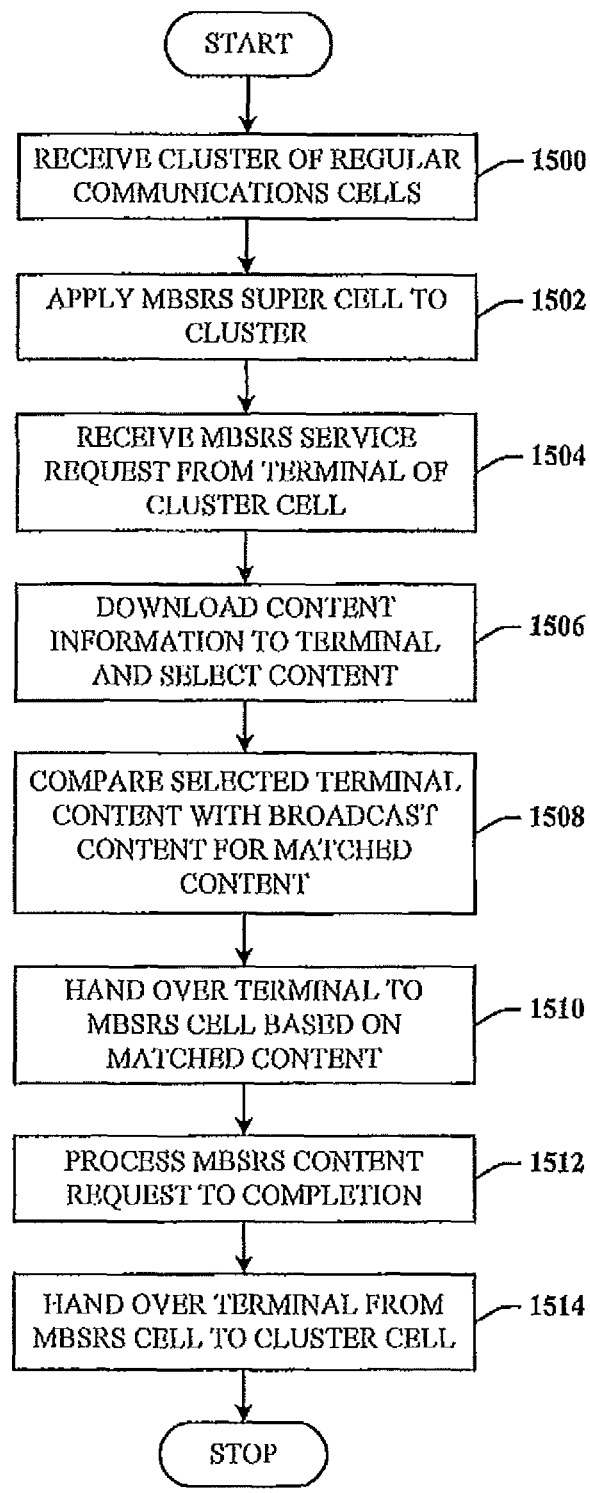
FIG. 15 illustrates a flow diagram of an alternative methodology of utilizing an MBSRS super cell for MBSRS processing.

FIG. 15 illustrates a flow diagram of an alternative methodology of utilizing an MBSRS super cell for MBSRS processing. At 1500, a cluster of regular cellular communications cells is received and deployed. At 1502, an MBSRS super cell is applied in combination with the cluster. At 1504, an MBSRS service request is received from a mobile terminal of a cluster cell. At 1506, content information associated with the available content is downloaded to the mobile terminal, and the terminal user selects which content to download. At 1508, the selected terminal content information is compared with broadcast content information for matched content. At 1510, the terminal is handed over to the MBSRS super cell based on the presence of matching content. At 1512, the MBSRS content request is processed to completion. At 1514, the terminal is handed back over from the MBSRS super cell to the cluster cell for normal terminal operation.

Figure 16:
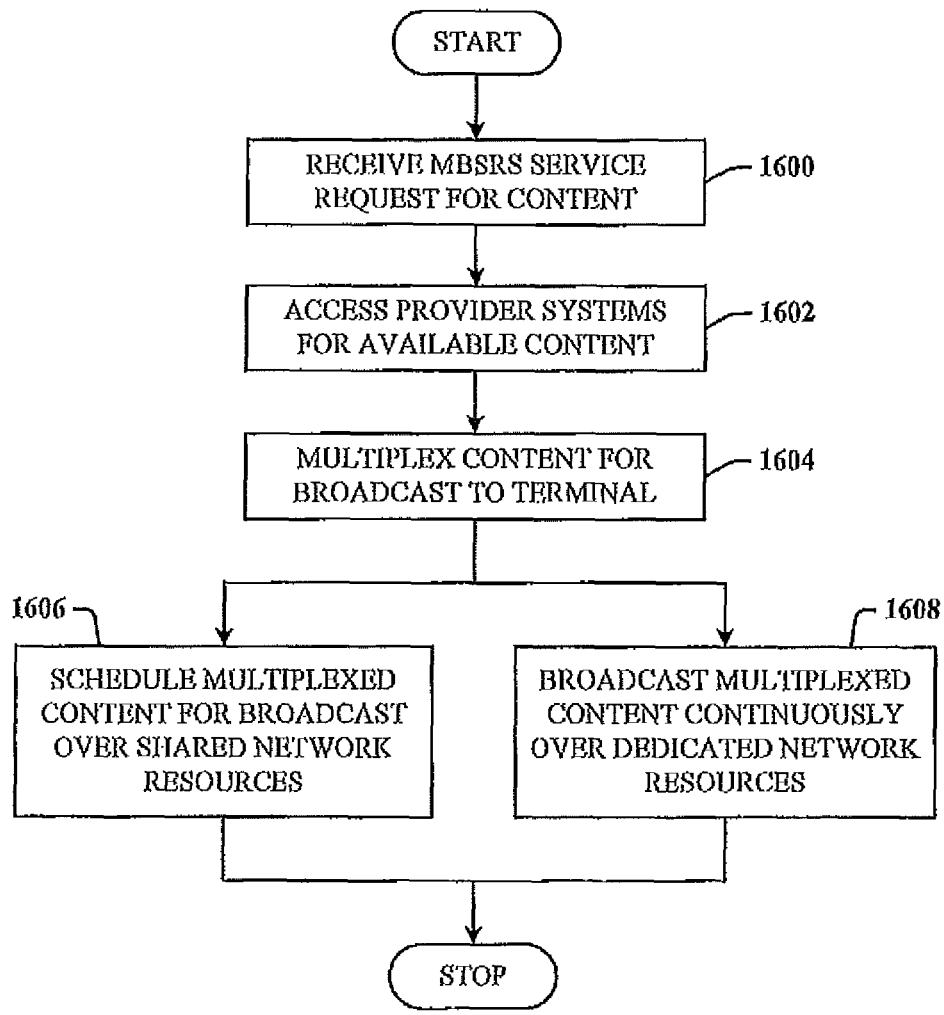
FIG. 16 illustrates a flow diagram of a methodology of processing content according to shared and/or dedicated network resources.

FIG. 16 illustrates a flow diagram of a methodology of processing content according to shared and/or dedicated network resources. At 1600, an MBSRS service request is received and deployed. At 1602, provider systems are accessed for available content. At 1604, the content is received and multiplexed in preparation for broadcast. At 1606, in one implementation, the multiplexed content is scheduled for broadcast over shared network resources. Alternatively, at 1608, the multiplexed content is broadcast continuously over dedicated network resources.

By using 3GPP specified functions for MBMS, the MBSRS provides controllable multimedia broadcast services. Compared to peer-to-peer service provisioning, the MBSRS provide a high data throughput rate for a large group of GSM and/or UMTS subscribers by only consuming limited network resources compared to peer-to-peer delivery methods. Contrasted with the MBMS multicast service, the MBSRS eliminates much of the complexity while maintaining control of the subscription process. Contrasted with the MBMS broadcast service, the MBSRS retains the simplicity of broadcast and ensures the revenue for an operator while extending the battery life of the mobile terminal.

The disclosed architecture can be configured to operate with other technologies. For example, user-selective multimedia broadcast can be employed with DVB-H (digital video broadcasting-handheld) and AHS (active home screen). In another application, the disclosed MBSRS service can be configured to operate in combination with the Japanese ISDB-T (terrestrial integrated services digital broadcasting), which can be deployed in both fixed and mobile reception.

As used in this application, the terms "component" and "system" are intended to refer to hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Figure 17:
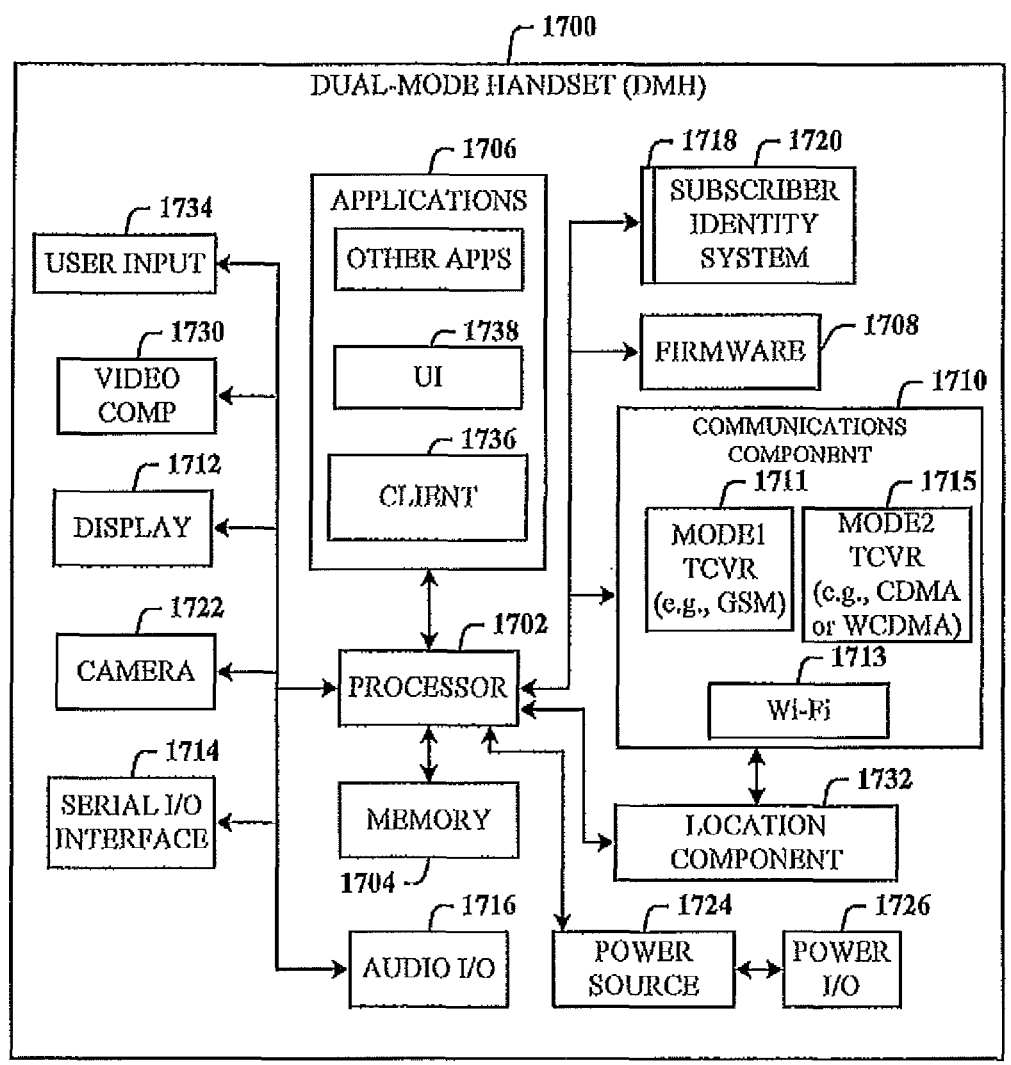
FIG. 17 illustrates a schematic block diagram of an exemplary dual mode handset operable to facilitate selection and receipt of multimedia content.

FIG. 17 illustrates a schematic block diagram of an exemplary dual mode handset 1700 operable to facilitate selection and receipt of multimedia content. However, a dual mode handset is not a requirement to obtain the benefits of user-selectable multimedia content download in accordance with the disclosed architecture. Any handset suitable for communicating over at least a GSM and/or UMTS cellular network can realize the disclosed user-selectable capabilities and associated services described herein. In order to provide additional context for various aspects thereof, FIG. 17 and the following discussion are intended to provide a brief, general description of a suitable terminal environment 1700 in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A cellular device can typically include a variety of computer-readable media. Computer-readable media can be any available media accessible by the terminal components and includes both volatile and non-volatile media and, removable and non-removable media. By way of example, and not by limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1700 includes a processor 1702 for controlling and processing onboard operations and functions. A memory 1704 interfaces to the processor 1702 for storage of data and one or more applications 1706 (e.g., a video player software, user feedback component software, etc.). Other applications can include voice recognition of predetermined voice commands that facilitate user selectable control of downloadable multimedia content, as described supra. The applications 1706 can be stored in the memory 1704 and/or in a firmware 1708, and executed by the processor 1702 from either or both the memory 1704 or/and the firmware 1708. The firmware 1708 can also store startup code for execution in initializing the handset 1700.

In accordance with aspects of the disclosed MBSRS, the applications 1706 can also include a terminal-based multiplexing software component that facilitates terminal-based multiplexing of broadcast content. Additionally, the control component that facilitates user-selectable control of multimedia content for download can be embodied as a software application in the handset 1700.

A communications component 1710 interfaces to the processor 1702 to facilitate wired/wireless communications with external systems, for example, cellular networks, VoIP networks, IP networks, and so on. Here, the communications component 1710 can also include a first suitable cellular transceiver 1711 (e.g., a GSM transceiver) as one mode, and a second cellular transceiver 1715 (e.g., a CDMA or WCDMA transceiver) for a second cellular mode. The handset 1700 can be a device such as a cellular telephone, a PDA with mobile communications capabilities, and messaging-centric devices, for example. The communications component 1710 can also facilitate communications reception from terrestrial radio networks (e.g., broadcast), digital satellite radio networks, and Internet-based radio services networks.

The handset 1700 includes a display 1712 for displaying text, images, video, telephony functions (e.g., a Caller ID function), setup functions, and for user input. The display 1712 can also accommodate the presentation of multimedia content (e.g., videos, music, music metadata, messages, wallpaper, graphics, . . . ). A serial I/O interface 1714 is provided in communication with the processor 1702 to facilitate wired and/or wireless serial communications (e.g., USB, and/or IEEE 1394) via a hardwire connection, and other serial input devices (e.g., a keyboard, keypad, and mouse). This supports updating and troubleshooting of the handset 1700, for example. Audio capabilities are provided with an audio I/O component 1716, which can include a speaker for the output of audio signals related to, for example, indication that the user pressed the proper key or key combination to initiate the user feedback signal. The audio I/O component 1716 also facilitates the input of audio signals via a microphone to record data and/or telephony voice data, and for inputting voice signals for telephone conversations.

The handset 1700 can include a slot interface 1718 for accommodating a subscriber identity system 1720 that can accommodate a SIM or universal SIM (USIM), and interfacing the subscriber identity system 1720 with the processor 1702. However, it is to be appreciated that the subscriber identity system 1720 can be manufactured into the handset 1700, and updated by downloading data and software thereinto.

The handset 1700 can process IP data traffic via the communications component 1710 to accommodate IP traffic from an IP network such as, for example, the Internet, a corporate intranet, a home broadband network, a person area network, etc., via an ISP or broadband cable provider. Thus, VoIP traffic can be utilized by the handset 1700 and IP-based multimedia content can be received in either an encoded or decoded format.

An image capture and processing component 1722 (e.g., a camera) can be provided for decoding encoded multimedia content. The handset 1700 also includes a power source 1724 in the form of batteries and/or an AC power subsystem, which power source 1724 can interface to an external power system or charging equipment (not shown) via a power I/O component 1726.

The handset 1700 can also include a video component 1730 for processing video content received and, for recording and transmitting video content. A location tracking component 1732 facilitates geographically locating the handset 1700 (e.g., GPS-global positioning system). A user input component 1734 facilitates the user input via conventional input device technologies such as a keypad, keyboard, mouse, stylus pen, touch screen and voice activation, for example.

Referring again to the applications 1706, a client 1736 can be provided that facilitates user selection of content to be downloaded. User selections can be stored, for example, by storing content IDs corresponding to content selected by the user. These content IDs stored at the terminal can be used by the client 1736 to compare to content IDs broadcast by the MBSRS to selectively receive the chosen content at the handset 1700. The applications 1706 can also include a user interface application 1738 that operates with the client 1736 to facilitate user interaction and present the multimedia content selection user interface.

The handset 1700 can also include an indoor network radio transceiver 1713 (e.g., WiFi transceiver). This function supports the indoor radio link, such as IEEE 802.11, for the dual-mode GSM handset 1700. The handset 1700 can also accommodate satellite radio services through a handset that combines wireless voice and digital radio chipsets into a single handheld device. It is to be understood that although the handset 1700 is illustrated as including a GSM mode, modes other than GSM can be accommodated, such as UMTS network operation, as indicated supra.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A mobile communications device comprising:
   a processor; and
   a memory comprising instructions that, when executed by the processor, cause the processor to perform operations comprising:
      receiving, from a multimedia communications service by way of a regular cell of a cluster of cells of a cellular communications network, multimedia content identity information associated with multimedia content provided by a service provider;
      initiating, responsive to a match between the multimedia content identity information received and user-selected multimedia content identity information, a handover from a regular cell of the cluster of cells of the cellular communications network to a super cell of the cluster of cells of the cellular communications network;
      receiving the multimedia content from the multimedia communications service by way of the super cell after the handover to the super cell, wherein the handover is a first handover; and
      initiating, responsive to receiving the multimedia content, a second handover from the super cell of the cluster of cells of the cellular communications network to a regular cell of the cluster of cells of the cellular communications network.

2. The mobile communications device of claim 1, wherein a service area of the super cell covers a service area of a plurality of regular cells of the cluster of cells of the cellular communications network.

3. The mobile communications device of claim 1, wherein the super cell is collocated with a regular cell of the cluster of cells of the cellular communications network.

4. The mobile communications device of claim 1, wherein receiving the multimedia content comprises receiving one type of multimedia content from the multimedia communications service as part of a session.

5. The mobile communications device of claim 1, wherein receiving the multimedia content comprises receiving multiple types of multimedia content from the multimedia communications service as part of a session.

6. The mobile communications device of claim 1, wherein the operations further comprise granting, responsive to a user selection, access to the multimedia communications service.

7. The mobile communications device of claim 1, wherein the operations further comprise storing, responsive to a subscription to the multimedia content, subscription data, corresponding to the subscription, as the user-selected multimedia content identity information.

8. The mobile communications device of claim 1, wherein initiating the handover to the super cell comprises changing to a packet connect state and connecting to a network-specified point-to-multipoint bearer.

9. The mobile communications device of claim 1, wherein receiving the multimedia content identity information associated with the multimedia content of the service provider is performed responsive to creation of a subscription to the multimedia content of the service provider.

10. The mobile communications device of claim 1, wherein the operations further comprise initiating, responsive to a session identification received from the multimedia communications service, a displaying of icons on the mobile communications device.

11. A non-transitory computer-readable medium storing instructions that, when executed by a processor of a mobile communications device, cause the processor to perform operations comprising:
    receiving, from a multimedia communications service by way of a regular cell of a cluster of cells of a cellular communications network, multimedia content identity information associated with multimedia content provided by a service provider;
    initiating, responsive to a match between the multimedia content identity information received and user-selected multimedia content identity information, a handover from a regular cell of the cluster of cells of the cellular communications network to a super cell of the cluster of cells of the cellular communications network;
    receiving, responsive to the handover to the super cell, the multimedia content from the multimedia communications service by way of the super cell, wherein the handover is a first handover; and
    initiating, responsive to receiving the multimedia content, a second handover from the super cell of the cluster of cells of the cellular communications network to a regular cell of the cluster of cells of the cellular communications network.

12. A multimedia communications service system, comprising:
    a processor; and
    a memory comprising instructions that, when executed by the processor, cause the processor to perform operations comprising:
       receiving, from a service provider, multimedia identity content information associated with multimedia content,
       initiating, by a regular cell of a cluster of cells of a cellular communications network, a transmission of the multimedia content identity information to a mobile communications device; and
       initiating, responsive to a handover by the mobile communications device from a regular cell of the cluster of cells of the cellular communications network to a super cell of the cluster of cells of the cellular communications network, a transmission of the multimedia content to the mobile communications device by the super cell, wherein the handover to the super cell is initiated responsive to a match between the multimedia content identity information transmitted and user-selected multimedia content identity information stored on the mobile communications device, wherein the handover is a first handover, and wherein a second handover from the super cell of the cluster of cells of the cellular communications network to a regular cell of the cluster of cells of the cellular communications network is initiated by the mobile communications device responsive to the mobile communications device receiving the multimedia content.

13. The multimedia communications service system of claim 12, wherein the super cell covers a service area of a plurality of regular cells of the cluster of cells of the cellular communications network.

14. The multimedia communications service system of claim 12, wherein the super cell is collocated with a regular cell of the cluster of cells of the cellular communications network.

15. The multimedia communications service system of claim 12, wherein initiating the transmission of the multimedia content comprises initiating a transmission of one type of multimedia content as part of a session.

16. The multimedia communications service system of claim 12, wherein initiating the transmission of the multimedia content comprises initiating a transmission of multiple types of multimedia content as part of a session.

17. The multimedia communications service system of claim 12, wherein the operations further comprise updating the multimedia content associated with the multimedia content identity information.

18. The multimedia communications service system of claim 12, wherein initiating the transmission of the multimedia content identity information to the mobile communications device is performed responsive to a creation of a subscription to a multimedia communications service by the mobile communications device.

19. The multimedia communications service system of claim 12, wherein the operations further comprise assigning, responsive to a creation of a subscription by the mobile communications device, a session identification to the mobile communications device.

* * * * *